United States Patent [19]
Koizumi et al.

[11] Patent Number: 4,845,700
[45] Date of Patent: Jul. 4, 1989

[54] FRONT LOADING DISC PLAYER

[75] Inventors: Toshiaki Koizumi; Masao Kase; Masatsugu Otaki; Masakazu Yamashita; Kenji Tanaka; Ryo Matsuura, all of Tokorozawa, Japan

[73] Assignee: Pioneer Electronic Corporation, Tokyo, Japan

[21] Appl. No.: 184,142

[22] Filed: Apr. 21, 1988

[30] Foreign Application Priority Data

| May 27, 1987 | [JP] | Japan | 62-130753 |
| May 27, 1987 | [JP] | Japan | 62-130754 |
| May 27, 1987 | [JP] | Japan | 62-130755 |
| May 27, 1987 | [JP] | Japan | 62-130756 |
| May 27, 1987 | [JP] | Japan | 62-130757 |
| May 27, 1987 | [JP] | Japan | 62-130758 |
| May 27, 1987 | [JP] | Japan | 62-130759 |

[51] Int. Cl.[4] .................... G11B 17/04; G11B 21/02; G11B 21/16
[52] U.S. Cl. .................... 369/75.2; 369/195; 369/199
[58] Field of Search .................... 369/75.2, 195, 199

[56] References Cited

U.S. PATENT DOCUMENTS

| 2,837,338 | 6/1958 | Andres | 369/195 |
| 4,566,087 | 1/1986 | Kraft | 369/34 |
| 4,692,916 | 4/1987 | Rowws | 369/75.2 |
| 4,737,945 | 4/1988 | Yamazaki et al. | 369/36 |

FOREIGN PATENT DOCUMENTS

56-77953 6/1981 Japan.
56-174156 12/1981 Japan.
57-169936 10/1982 Japan.

*Primary Examiner*—Steven L. Stephan
*Attorney, Agent, or Firm*—Fleit, Jacobson, Cohn & Price

[57] ABSTRACT

A front loading disc player plays back both sides of a loaded disc without ejecting and reloading the disc. The front loading disc player has a playback unit disposed in a player housing and having a turntable and an optical pickup, and a disc transfer mechanism for carrying a disc to be played back and transferring the disc into a playback position. The playback unit is movable by a playback means moving mechanism between a first position corresponding to one side of the disc having reached the playback position and a second position corresponding to the other side of the disc.

8 Claims, 34 Drawing Sheets

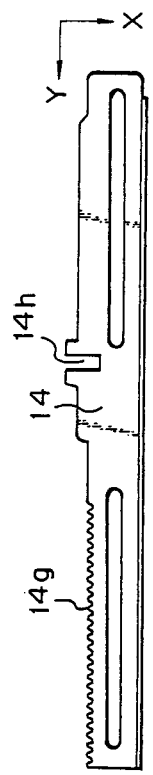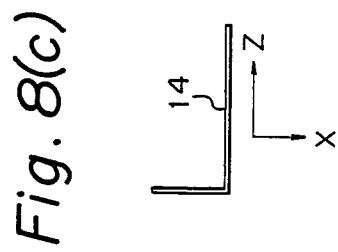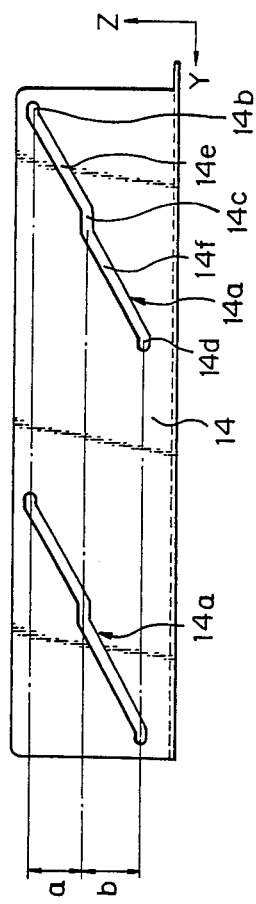

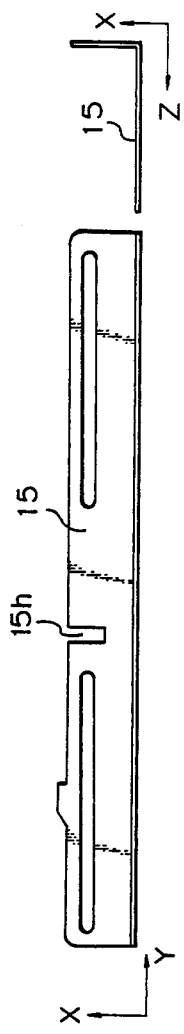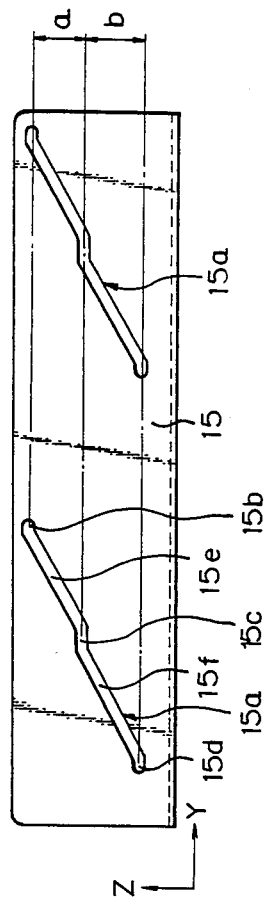

Fig. 10(a)
Fig. 10(b)
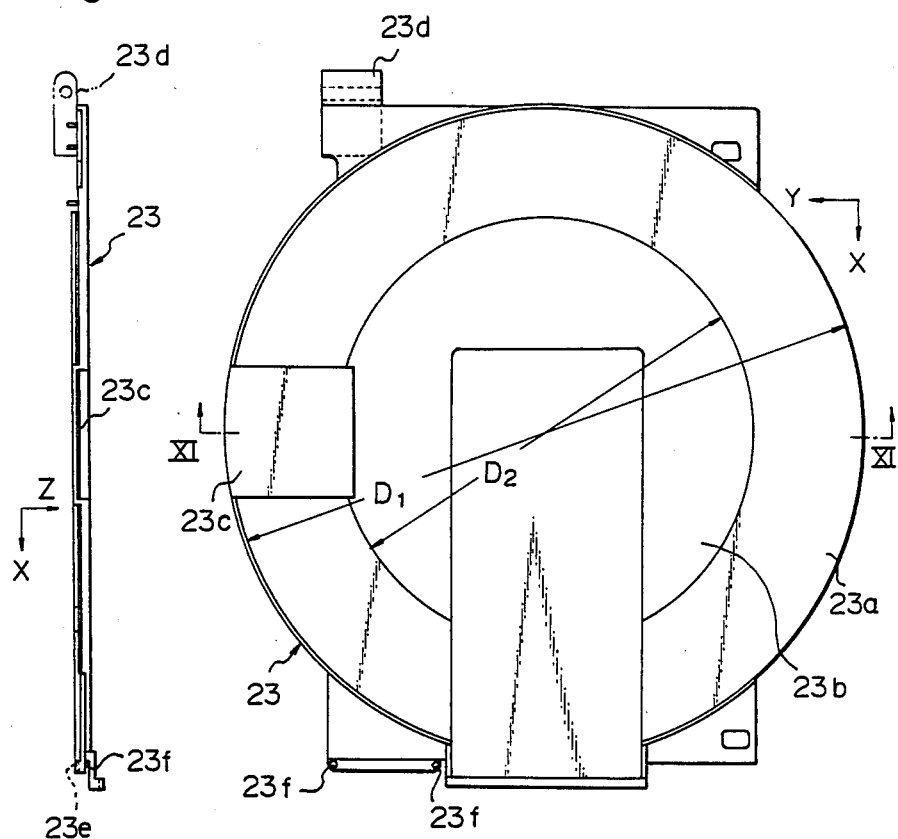
Fig. 10(c)
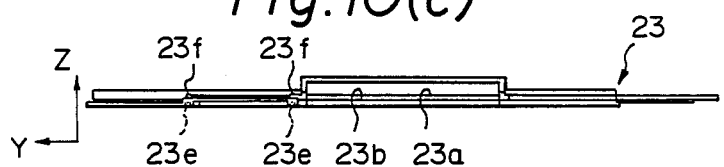

Fig. 23(a)
Fig. 23(b)
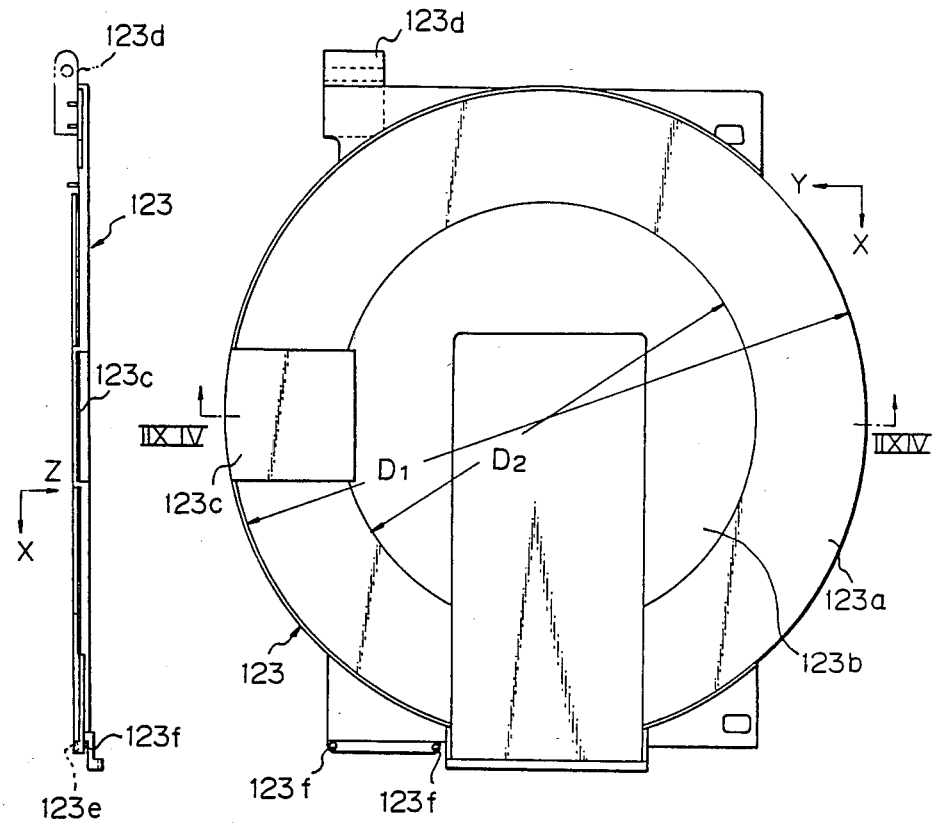
Fig. 23(c)
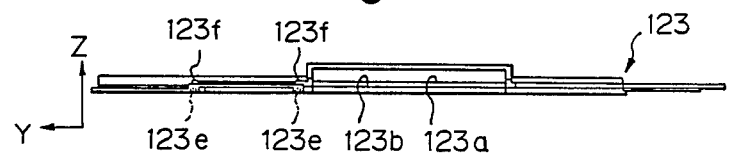

1

FRONT LOADING DISC PLAYER

BACKGROUND OF THE INVENTION (1) Field of the Invention:

The present invention relates to a front loading disc player.

(2) Description of the Prior Art:

Front loading disc players have a disc transfer mechanism for transferring a disc to be played back from a position outside of a player housing into a playback position, i.e., onto a turntable, and then positioning the disc on the turntable. Thereafter, the turntable is rotated about its own axis and a pickup means is moved radially over the disc along an information-recorded disc surface to reproduce the recorded information.

Some conventional front loading disc players only house one disc at a time and play back one side of the disc housed in the disc player. For playing back both sides of a disc or a number of discs successively in such a front loading disc player, it has been necessary to eject and load the disc or discs for turning the disc upside down or replacing the disc with another disc. The user of the disc player has been troubled by such a disc handling process.

There has been proposed a front loading disc player having two pickup means that are positioned so as to sandwich a disc placed on a turntable. In this proposed front loading disc player, both sides of the disc can be played back without ejecting and reloading the disc. However, the front loading disc player of this type is expensive to manufacture since the two costly pickup means must be employed.

SUMMARY OF THE INVENTION

In view of the aforesaid problems of the conventional front loading disc players, it is an object of the present invention to provide a front loading disc player that is inexpensive to manufacture which is capable of playing back both sides of a disc or a plurality of discs successively without ejecting the disc or discs.

Another object of the present invention is to provide a front loading disc player which is small in size and can load a disc or discs reliably and highly accurately.

According to the present invention, there is provided a front loading disc player comprising a player housing, playback means disposed in the player housing and having a turntable and pickup means, a disc transfer mechanism for carrying a disc to be played back and transferring the disc into a playback position, and a playback means moving mechanism for moving the playback means between a first position corresponding to one side of the disc having reached the playback position and a second position corresponding to the other side of the disc.

The playback means moving mechanism has a support member supporting the playback means, a pivotal support mechanism for pivotally supporting the support member to allow the playback means to rotate between the first and second positions, and driving means for rotating the support member.

The support member has a pivot axis parallel to the direction in which the pickup means moves.

The support member has a pivot axis substantially normal to the direction in which the disc is transferred.

The distance between a disc carrier surface of the turntable when the playback means is in the first position and the disc carrier surface of the turntable when the playback means is in the second position is equal to the thickness of the disc, and a median plane of the thickness of the disc placed on the turntable and the center of rotation of the turntable intersect at a point where a pivot axis of the support member passes.

The disc transfer mechanism has a carrier movable in a first direction with respect to the player housing, a tray for carrying a disc, which is disposed on the carrier and movable in the first direction and a second direction, and tray driving means for moving the tray with respect to the carrier.

The carrier is single in number, and a plurality of trays are disposed on the carrier.

The front loading disc player also includes control means for controlling the playback means and the disc transfer mechanism, the playback means including a disc clamping mechanism, the arrangement being such that when the playback means is in the second position, the control means moves the tray closely to the turntable and thereafter actuates the disc clamp mechanism to clamp the disc.

A plurality of trays are juxtaposed with each other on the carrier in the second direction, the distance between disc carrier surfaces of adjacent ones of the trays is equal to a unit distance through which each of the trays is movable in the second direction.

According to the present invention, there is further provided a front loading disc player comprising a player housing, playback means disposed in the player housing and having a turntable and pickup means, a disc transfer mechanism for carrying a disc to be played back and transferring the disc into a playback position, a plurality of carriers arranged side by side in a first direction and movable in a second direction with respect to the player housing, a plurality of trays disposed on the carrier respectively, for carrying respective discs and movable in the second direction, carrier driving means for moving the carrier tray driving means for moving the trays with respect to the carrier first playback means moving mechanism for moving the playback means between a first position corresponding to one side of a disc having reached the playback position and a second position corresponding to the other side of the disc, and second playback means moving mechanism for carrying and moving the playback means and the first playback means moving mechanism in the first direction.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 8(a)-8(c), 9(a)-9(c) 10(a)-10(c), and 11 are views showing the internal structure of FIG. 3 in detail;

FIGS. 23(a)-23(c), 24, and 25 are views showing the internal structure of FIG. 20 in detail;

DESCRIPTION OF THE PREFERRED EMBODIMENTS

A front loading disc player according to a first embodiment will now be described with reference to FIGS. 1 through 17.

Figure 1:
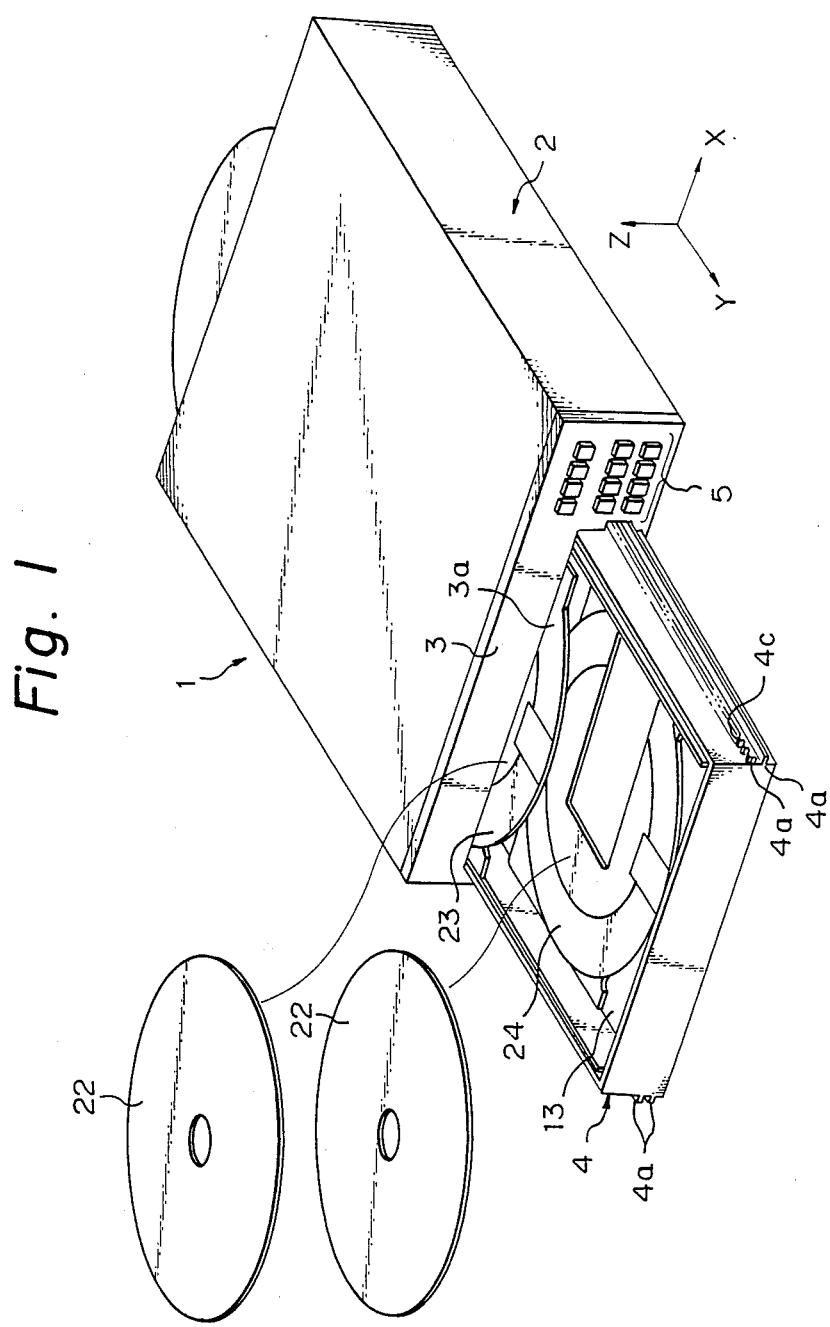
FIG. 1 is a perspective view of a front loading disc player according to a first embodiment of the present invention.

As shown in FIG. 1, the front loading disc player, generally designated by the reference numeral 1, has a player housing 2 including a front panel 3 with a laterally elongate rectangular slot 3a defined therein through which a carrier 4 can project out of the player housing 2. More specifically, the rectangular slot 3a is elongate laterally in the direction of the arrow X (leftward direction) and the direction opposite thereto (rightward direction), both across the direction of the arrow Y (forward direction) in which the front panel 3 faces. The direction of the arrow Z is an upward direction normal to the directions of the arrows X, Y. A keyboard 5 for controlling operation of the disc player is disposed on the front panel 3 on the lefthand side of the slot 3a.

Figure 2:
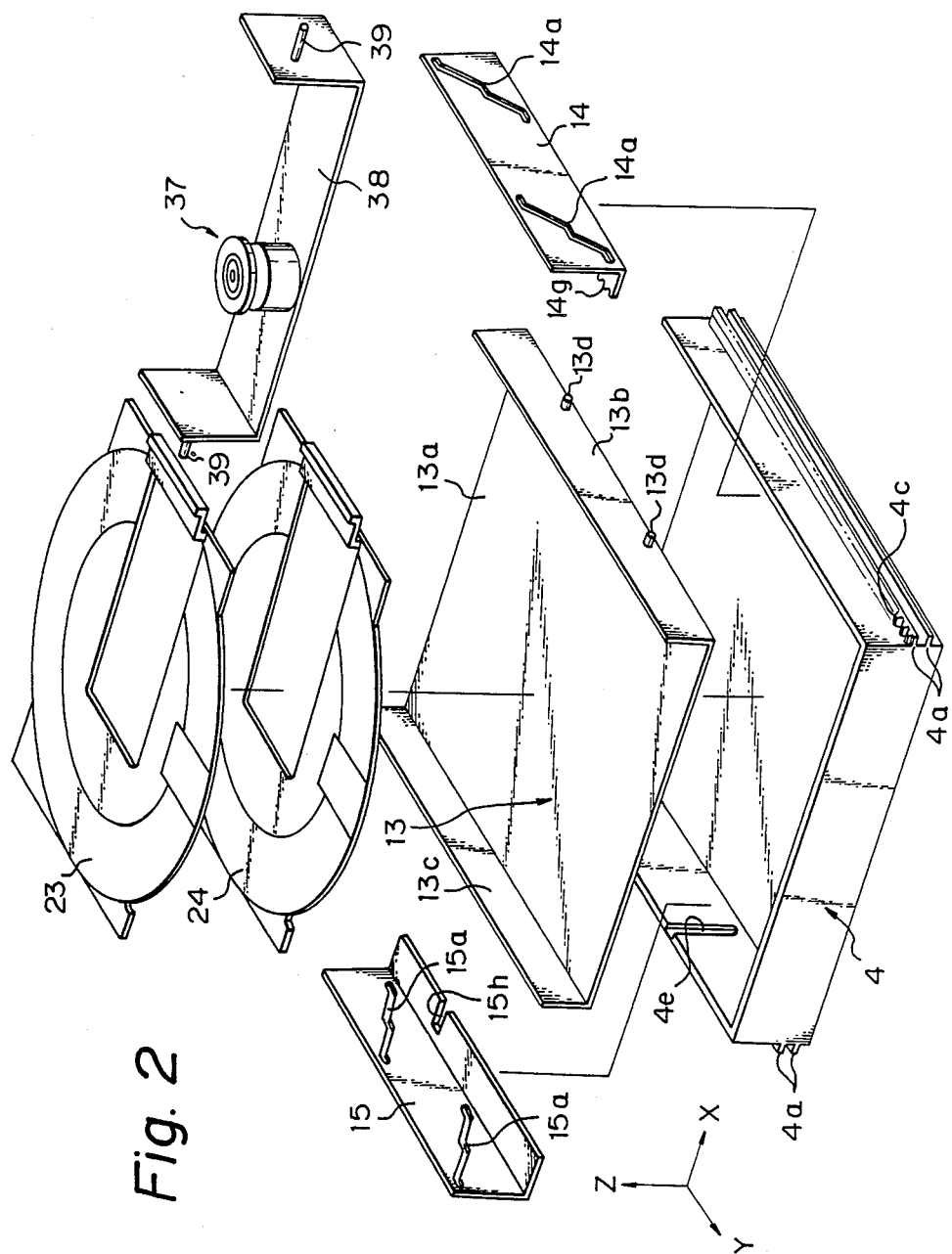
FIG. 2 is an exploded perspective view of an internal structure of the front loading disc player shown in FIG. 1.
Figure 3:
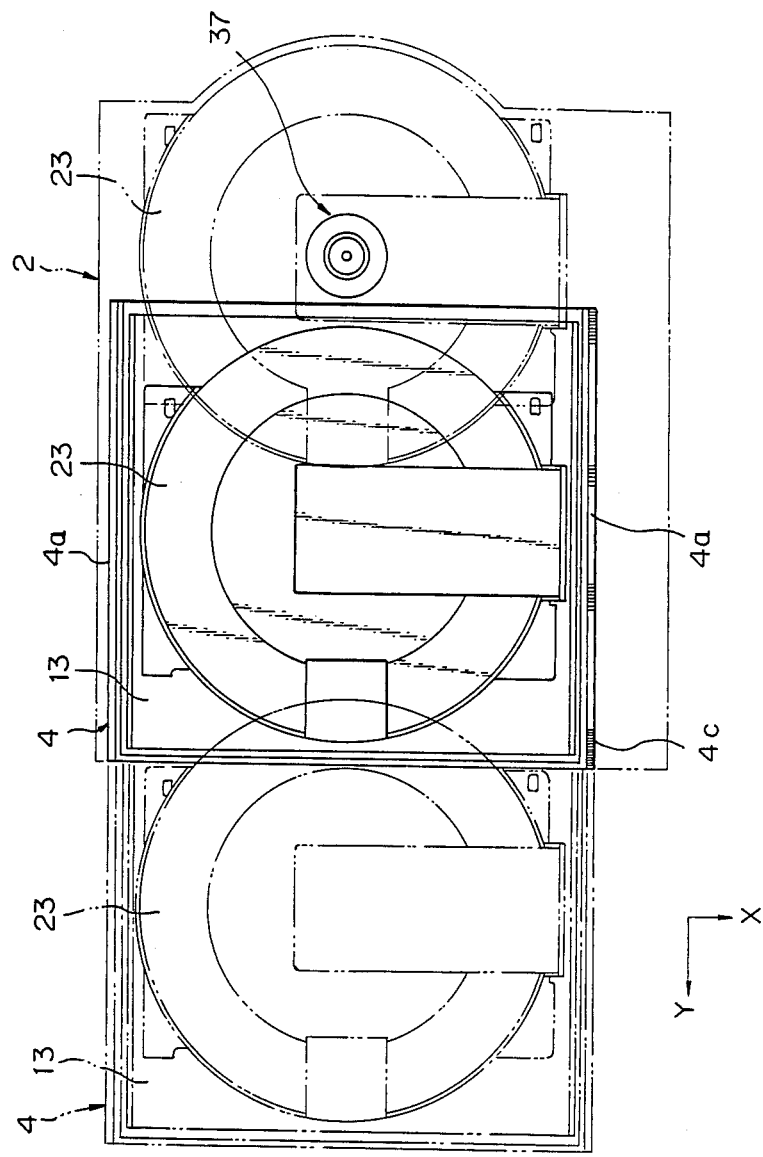
FIG. 3 is an view of the internal structure of the front loading disc player shown in FIG. 1.
Figure 4:
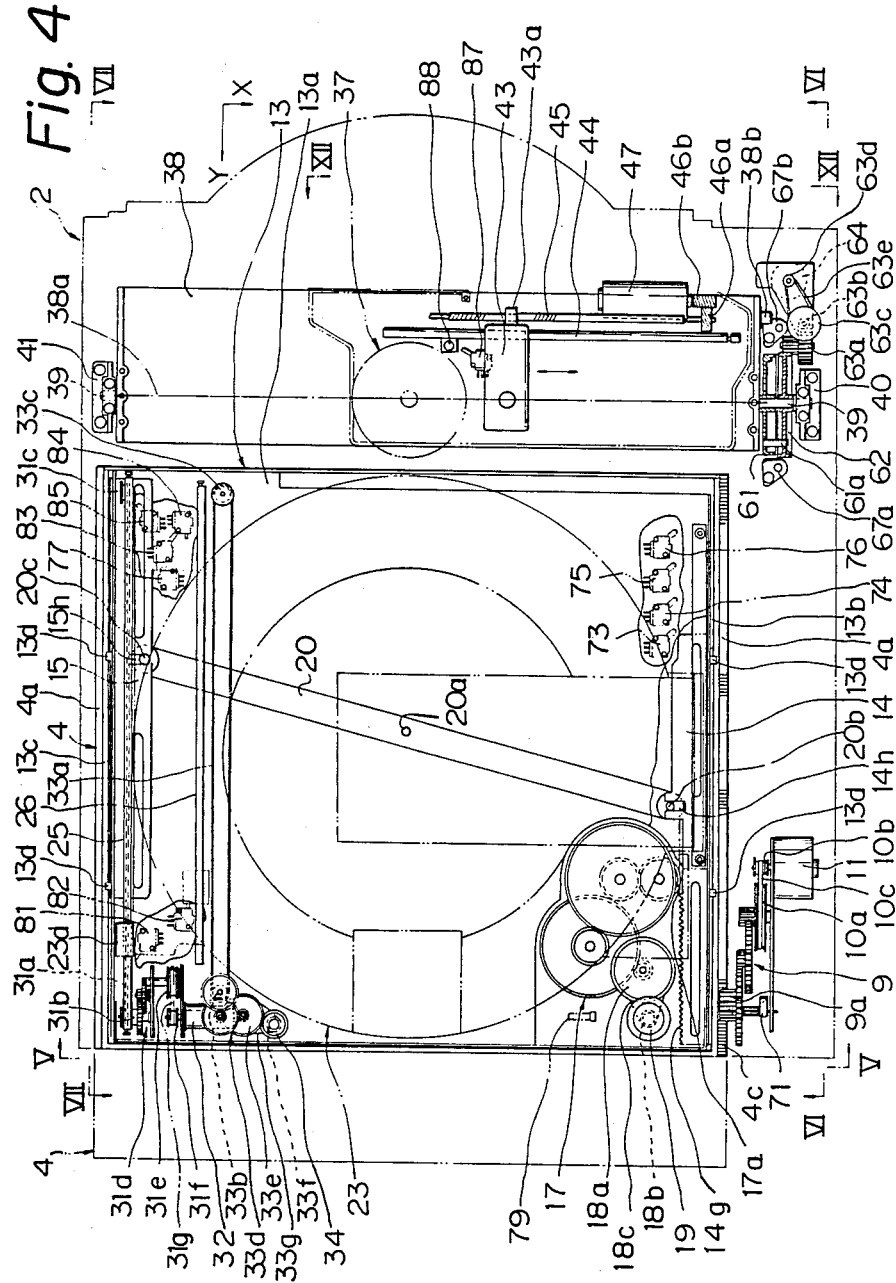
FIG. 4 is a plan view, partly in cross section, of the internal structure illustrated in FIG. 3.
Figure 5:
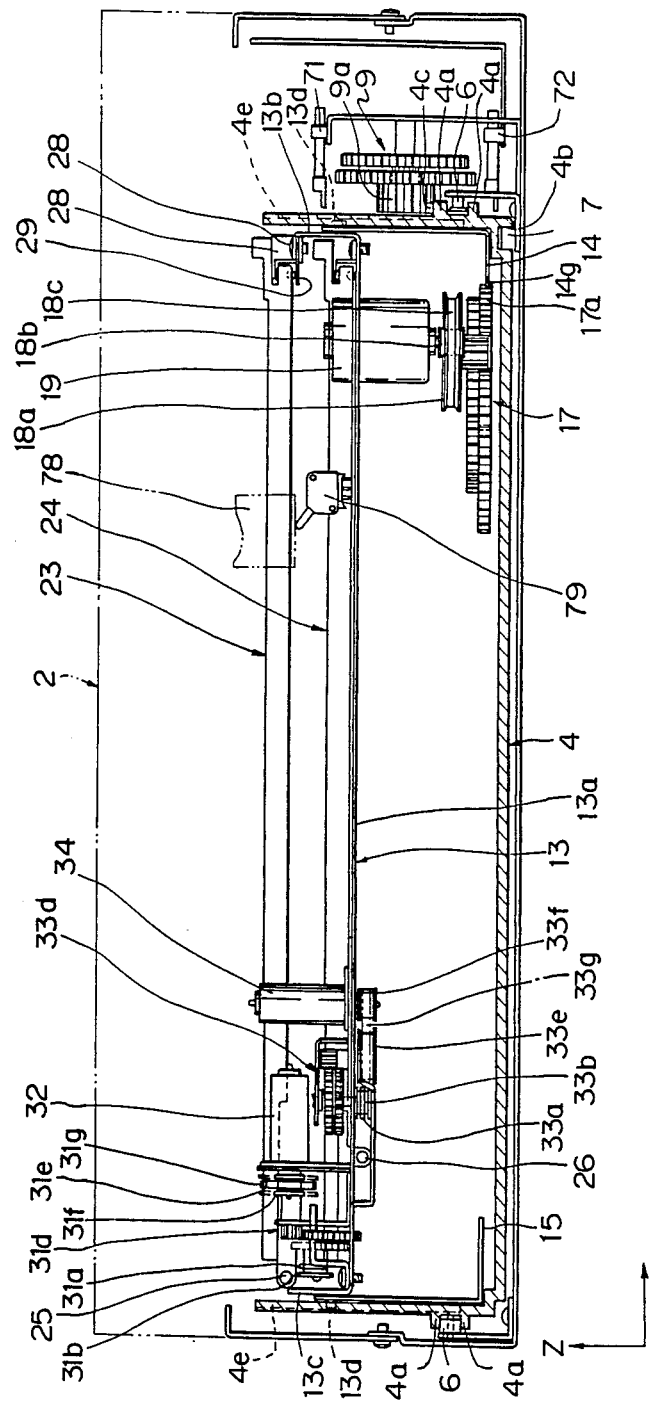
FIG. 5 is a cross-sectional view taken along line V—V of FIG. 4.
Figure 6:
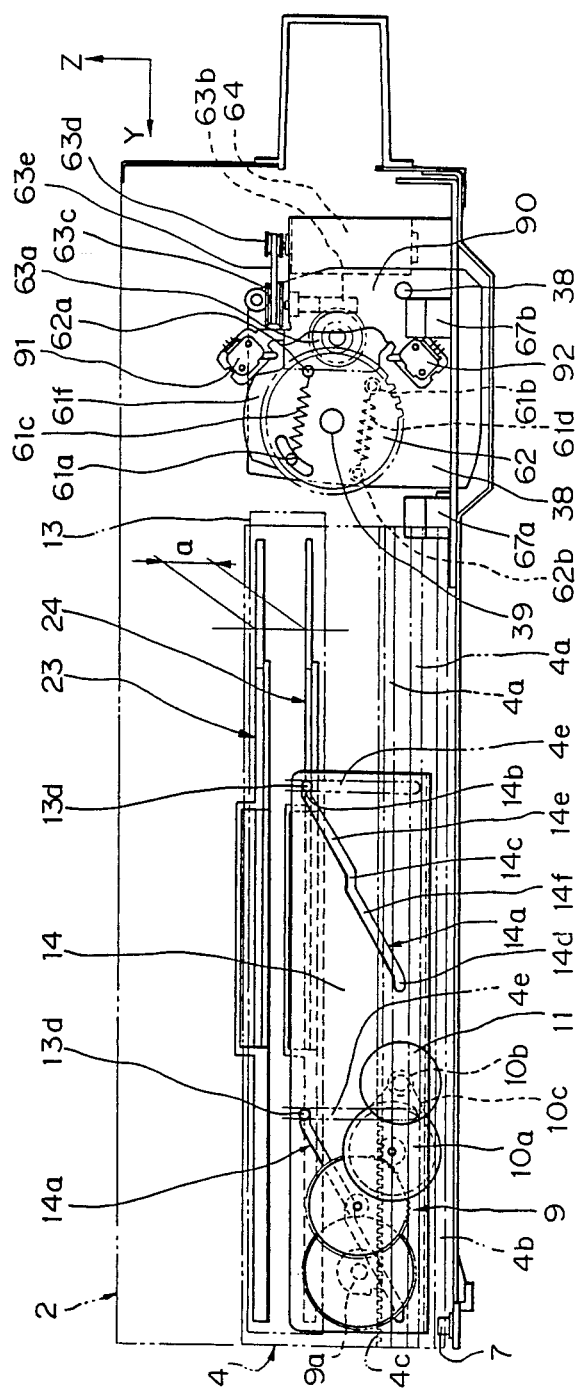
FIG. 6 is a cross-sectional view taken along line VI—VI of FIG. 4.

As shown in FIG. 2, the carrier 4 is formed into a hollow rectangular parallelepiped with its upper and rear sides open. As indicated by the solid lines and the two-dot-and-dash lines in FIG. 3, the carrier 4 is movable in a first or fore-and-aft direction (the direction of the arrow Y and the direction opposite thereto) between a stored position in the player housing 2 and a projected position out of the player housing 2. More specifically, as shown in FIGS. 4 through 6, the carrier 4 has two pairs of parallel longitudinal ridges or guide rails 4a extending in the fore-and-aft direction on opposite outer lateral sides thereof. Guide rollers 6 rollingly ride between the ridges 4a in each pair, as shown in FIG. 5. As illustrated in FIGS. 5 and 6, a groove 4b is defined in a lefthand portion of the lower surface of the carrier 4, the groove 4b extending the entire length of the carrier 4 in the direction in which the carrier 4 is movable. A cylindrical guide member 7 is fixed to the player housing 2 and positioned in the groove 4b in slidable engagment with the surfaces defining the groove 4b. Therefore, the carrier 4 can be guided for back-and-forth movement without wobbling in the lateral direction (the direction of the arrow X and the direction opposite thereto).

The upper one of the ridges 4a in the pair on the lefthand side of the carrier 4 has a rack 4c disposed on and extending over the entire upper surface thereof. As shown in FIGS. 4 through 6, the rack 4c is held in mesh with a gear 9a which is a final gear of a speed reducer gear mechanism 9. The carrier 4 is moved by a motor 11 through the speed reducer gear mechanism 9, toothed pulleys 10a, 10b, and a toothed belt 10c trained around the tooled pulleys 10a, 10b. The speed reducer gear mechanism 9, the toothed pulleys 10a, 10b, the toothed belt 10c, and the motor 11 jointly serve as a carrier driving means for moving the carrier 4.

As shown in FIGS. 1 and 2, a movable chassis 13 is disposed in the carrier 4. The movable chassis 13 comprises a flat portion 13a extending in the fore-and-aft direction (the direction of the arrow Y and the direction opposite thereto) and in the lateral direction (the direction of the arrow X and the direction opposite thereto), and a pair of laterally spaced upright portions 13b, 13c extending upwardly (in the direction of the arrow Z) contiguously from the lateral side edges of the flat portion 13a. As shown in FIGS. 2, 4 through 7, a pair of movable members 14, 15 extending in the fore-and-aft direction (the direction of the arrow Y and the direction opposite thereto) is disposed outside of the lateral upright portions 13b, 13c of the movable chassis 13, the movable members 14, 15 being movable reciprocably in the fore-and-aft direction. The movable members 14, 15 are shown in detail in FIGS. 8(a) through 8(c) and 9(a) through 9(c).

In FIGS. 2, 4 through 7, four pins 13d are mounted on the upright portions 13b, 13c (two pins on each upright portion). As shown in FIGS. 2, 5 through 7, the pins 13d are slidably fitted in respective guide grooves 4e defined in lateral inner wall surfaces of the carrier 4 and extending in the vertical direction (the direction of the arrow Z and the direction opposite thereto) for guiding vertical movement of the movable chassis 13.

The pins 13d on the upright portions 13b, 13c of the movable chassis 13 also slidably engage in pairs of cam slots 14a, 15a defined in the movable members 14, 15, respectively. The cam slots 14a defined in the movable member 14 positioned leftwardly of the movable chassis 13 are generally inclined downwardly (in the direction opposite to the direction of the arrow Z) in the forward direction (the direction of the arrow Y). The cam slots 15a defined in the other movable member 15 are generally inclined upwardly in the forward direction. The cam slots 14a, 15a are thus shaped such that the movable chassis 13 is vertically moved when the movable members 14, 15 are moved relatively to each other.

The cam slots 14a, 15a comprise three short straight portions 14b, 14c, 14d; 15b, 15c, 15d, respectively, extending in the direction (fore-and-aft direction) in which the movable members 14, 15 are movable, and two slanted portions 14e, 14f; 15e, 15f, respectively, contiguous to and inclined with respect to the short straight portions 14b, 14c, 14d; 15b, 15c, 15d. Therefore, the cam slots 14a, 15b are generally staircase-shaped as a whole. Consequently, the movable chassis 13 is moved intermittently in two steps when the movable members 14, 15 are moved.

As shown in FIGS. 2, 4, 5, 8(a), and 8(c), the movable member 14 on the lefthand side of the movable chassis 13 has a rack 14g extending in the direction in which the movable member 14 is movable. As illustrated in FIGS. 4 and 5, the rack 14g is held in mesh with a final gear 17a of a speed reducer gear mechanism 17 mounted on the carrier 4. The movable member 14 is driven by a driving force imparting means comprising the speed reducer gear mechanism 17, toothed pulleys 18a, 18b, a toothed belt 18c trained therearound, and a motor 19.

As shown in FIG. 4, between the movable members 14, 15, there is disposed a swing lever 20 centrally mounted angularly movably on the carrier 4 by a support shaft or pin 20a extending vertically (in the direction of the arrow Z and the direction opposite thereto). The swing lever 20 supports on its opposite ends two pins 20b, 20c, respectively, projecting parallel to the support shaft 20a and smoothly engaging in respective recesses 14h, 15h defined respectively in the movable members 14, 15.

Two trays 23, 24 each for carrying a disc 22 (FIG. 1) are disposed, one over the other, on the movable chassis 13, with a prescribed gap provided between the trays 23, 24 in a second or vertical direction (the direction of the arrow Z and the direction opposite thereto). The movable chassis 13, the movable members 14, 15, the swing lever 20, the driving force imparting means including the motor 19 and other members for imparting a driving force to the movable member 14, and related minor members jointly constitute a second tray driving means for moving the trays 23, 24 in the second direction with respect to the carrier 4.

Figure 11:
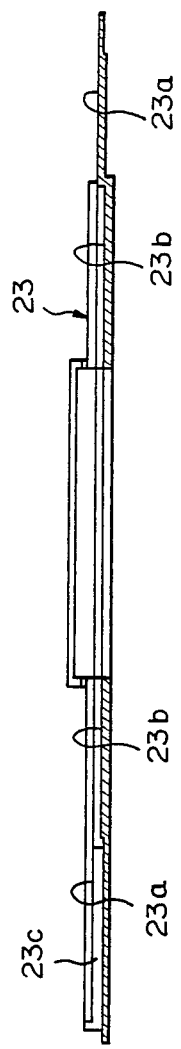

FIGS. 10(a) through 10(c) and 11 show the tray 23 in detail, FIG. 11 being a cross-sectional view taken along line XI—XI of FIG. 10(a). The other tray 24 will not be described in detail as it is identical to the tray 23.

The tray 23 has a first disc carrier surface 23a having a diameter D1 for carrying a disc 22 (FIG. 1) of a diameter of about 30 cm, and a second disc carrier surface 23b having a diameter D2 for carrying a disc (not shown) of a diameter of about 20 cm, the first and second disc carrier surfaces 23a, 23b being concentric with each other. As is clear from FIG. 11, the second disc carrier surface 23b is defined as a recess with respect to the first disc carrier surface 23a, the second disc carrier surface 23b having a depth greater than the thickness of the disc to be carried on the second disc carrier surface 23b. The tray 23 has a recess 23c defined in a front end thereof for inserting a finger therethrough below the disc carried on the first or second disc carrier surface 23a or 23b to remove the disc. The recess 23c has a depth from the first disc carrier surface 23a, the depth being larger than the depth of the second disc carrier surface 23b.

Figure 7:
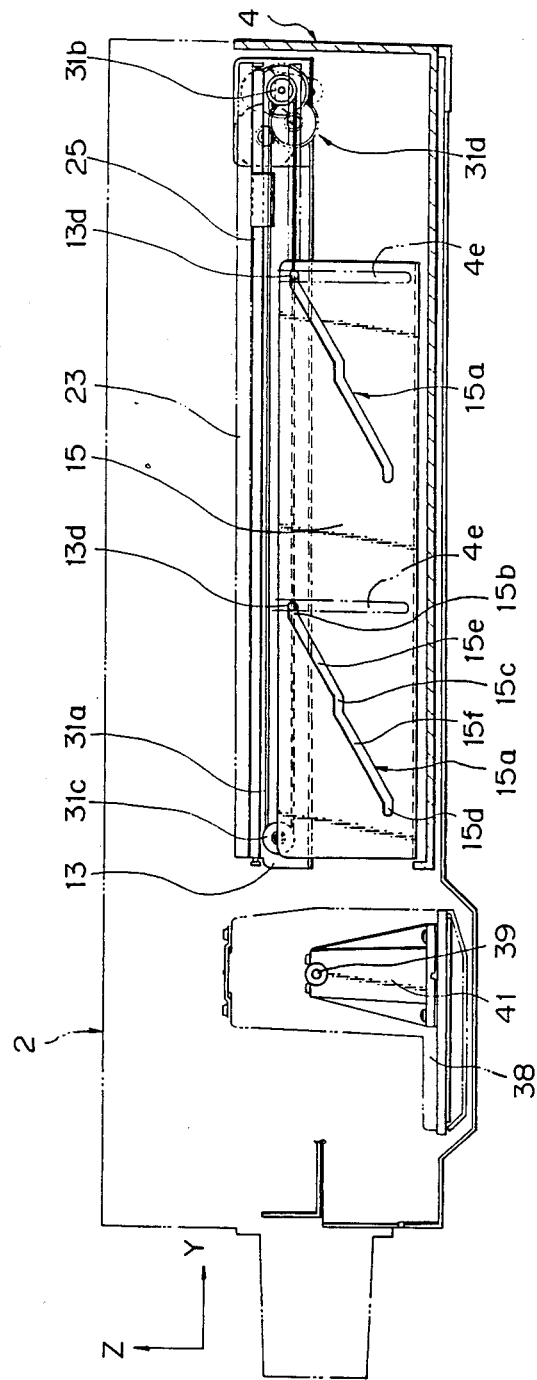
FIG. 7 is a cross-sectional view taken along line VII—VII of FIG. 4.

The trays 23, 24 are movable with respect to the movable chassis 13 on which they are carried, and hence with respect to the carrier 4, in the first or fore-and-aft direction (the direction of the arrow Y and the direction opposite thereto). As shown in FIGS. 4, 5, and 7, righthand ends of the trays 23, 24 slidably engage two guide shafts 25, 26, respectively, disposed on a right-hand portion of the movable chassis 13 and extending in the fore-and-aft direction. As illustrated in FIG. 5, lefthand ends of the trays 23, 24 are slidably held against guide members 28 and guide plates 29 disposed on the movable chassis 13. The trays 23, 24 are therefore smoothly guided for movement in the fore-and-aft direction by these guide shafts 25, 26, the guide member 28, and the guide plate 29. As illustrated in FIGS. 10(a) through 10(c), the tray 23 has a block 23d slidably fitted over the guide shaft 25, and steel balls 23e and hemispherical projections 23f which are slidably held against the guide members 28 and the guide plates 29. Likewise, the tray 24 has a block, steel balls, and hemispherical projections.

As shown in FIGS. 4, 5, and 7, a pair of pulleys 31b, 31c with a wire 31a trained therearound is mounted on the righthand end of the movable chassis 13, the wire 31a being coupled to the tray 23. The pulley 31b is rotatable by a motor 32 through a speed reducer gear mechanism 31d, toothed pulleys 31e, 31f, and a toothed belt 31g trained therearound. When the motor 32 is rotated in one direction (normal direction) and then the other direction (reverse direction), the tray 23 is reciprocably moved in the fore-and-aft direction. As illustrated in FIGS. 4 and 5, the tray 24 is reciprocably movable by a wire 33a, pulleys 33b, 33c, a speed reducer gear mechanism 33d, toothed pulleys 33e, 33f, a toothed belt 33g, and a motor 34.

The wires 31a, 33a, the pulleys 31b, 31c, 33b, 33c, the speed reducer gear mechanisms 31d, 33d, the toothed pulleys 31e, 31f, 33e, 33f, the toothed belts 31g, 33g, and the motors 32, 34 jointly constitute a first tray driving means for moving the trays 23, 24 in the first or fore-and-aft direction with respect to the carrier 4. As shown in FIG. 3, the trays 23, 24 are movable between a first position directly above the carrier 4 and a second position rearward of the carrier 4.

The first tray driving means, the second tray driving means, the trays 23, 24, and the carrier 4 jointly constitute a disc transfer mechanism for carrying a disc 22 (FIG. 1) to be played and transferring the disc 22 into a playback position in the player housing 2.

As described above, the carrier 4 is movable between the projected and stored positions in the fore-and-aft direction with respect to the player housing 2, and the trays 23, 24 disposed on the carrier 4 are movable between the first and second positions in the fore-and-aft direction with respect to the carrier 4. Therefore, as shown in FIG. 3, each of the trays can assume the projected position out of the player housing 2, the stored position in the player housing 2, and also the playback position at a deepest position in the player housing 2.

Figure 12:
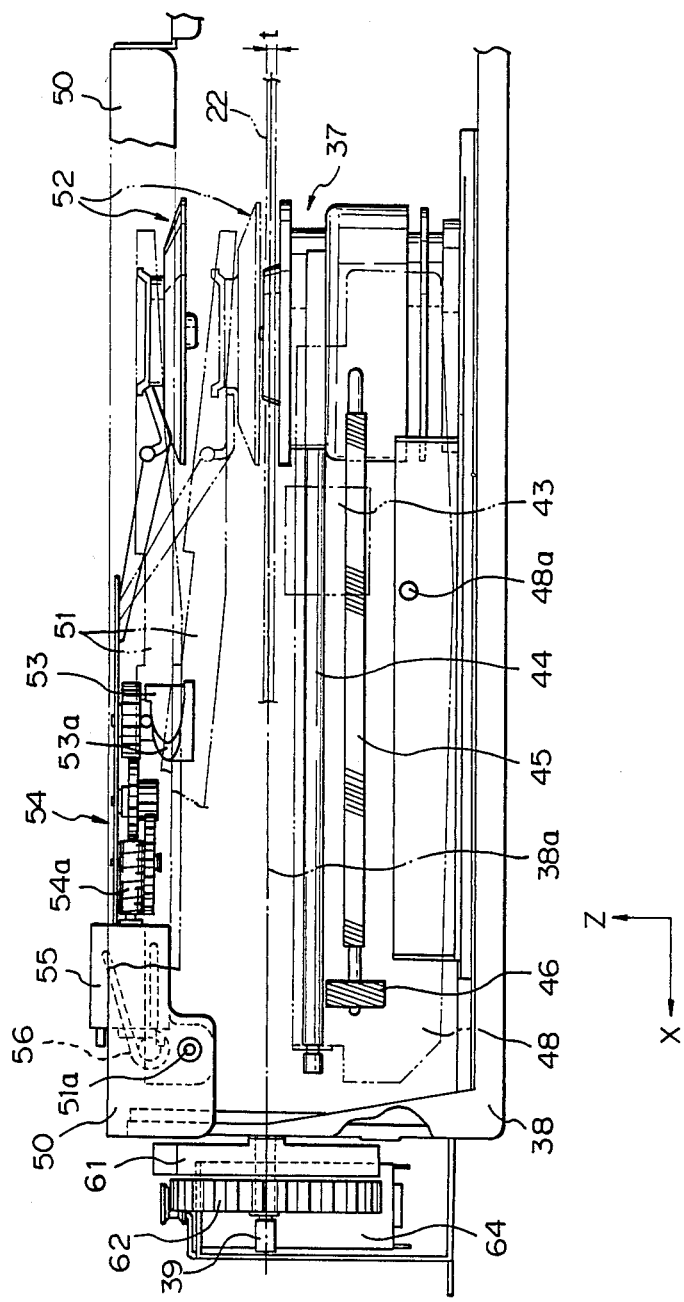
FIG. 12 is a cross-sectional view taken along line XII—XII of FIG. 4.

As shown in FIGS. 2 through 3, 6, 7, and 12, a turntable 37 is disposed way back in the housing 2 and supported by a support member 38 extending laterally in the player housing 2. The support member 38 has a pair of support shafts 39 extending laterally from the opposite ends thereof and rotatably supported by a pair of respective bearings 40, 41 fixedly mounted in the player housing 2. As shown in FIGS. 4 and 12, a carriage 43 supporting an optical pickup means is mounted on the support member 38 through a guide shaft 44 so as to be movable in the lateral direction (the direction of the arrow X and the direction opposite thereto) along a plane parallel to a disc carrier surface of the turntable 37. The carriage 43 is movable by a carriage driving means comprising a worm 45 meshing with a half nut 43a mounted on the carriage 43, a worm wheel 46a for rotating the worm 45 about its own axis, a worm 46b meshing with the worm wheel 46a, and a motor 47 having an output shaft coupled to the worm 46b. As shown in FIG. 12, the carriage 43, the guide shaft 44, the worm 45, and the motor 47 are mounted on a swingable plate 48 swingably disposed on the support member 38 by means of a pin 48a. The swingable plate 48 swings in a plane normal to the disc carrier surface of the turntable 37. There is a drive source for swinging the swingable plate 48 through a tilt-servo means.

As illustrated in FIG. 12, a longitudinal bracket 50 is attached to the support member 38 parallel thereto. To the bracket 50, there is swingably attached an arm 51 through a pin 51a. A disc-shaped presser 52 is rotatably mounted on the free end of the arm 51 for pressing a disc in the playback position against the turntable 37 thereby to clamp the disc in place on the turntable 37. A cam member 53 having a spiral cam surface 53a is rotatably mounted on the longitudinal bracket 50 and held in engagement with the arm 51. In response to rotation of the cam member 53, the arm 51 is caused to swing to move the presser 52 toward or away from the turntable 37. The cam member 53 is rotatable by a motor 55 through a speed reducer gear mechanism 54 including a worm 54a. The arm 51 is normally urged by a spring 56 in a direction to displace the presser 52 toward the turntable 37.

The arm 51, the presser 52, the cam member 53, the speed reducer gear mechanism 54, the motor 55, and the spring 56 jointly serve as a disc clamping mechanism. The disc clamping mechanism, the turntable 37, the optical pickup means, and the tilt-servo means jointly constitute a playback means for playing back discs.

The entire playback means is mounted on the support member 38. As described above, the support member 38 is pivotally supported by a pivotal support mechanism which comprises the support shafts 39 and the bearings 40, 41. Therefore, the playback means can be angularly moved between a position corresponding to the lower surface of a disc 22 which has been transferred into the playback position by the disc transfer mechanism and a position corresponding to the upper surface of the disc.

As shown in FIGS. 4 and 12, the support member 38 has a pivot axis 38a parallel to the direction in which the carriage 43 carrying the optical pickup means moves. With this arrangement, the space in the player housing 2 is effectively utilized while minimizing any dead space therein, and hence the disc player is of a reduced overall size. The pivot axis 38a is perpendicular to the fore-and-aft direction (the direction of the arrow Y and the direction opposite thereto) in which a disc can be transferred. This arrangement is also effective in reducing the overall size of the disc player, particularly its transverse size.

A drive means for rotating the support member 38 which supports the playback means including the turntable 37 will hereinafter be described.

As shown in FIGS. 4, 6, and 12, a disc-shaped member 61 is fitted over the support shaft 39 on the lefthand end of the support member 38 for rotation with the support member 38. A gear 62 is rotatably mounted on the support shaft 39 on the lefthand side of disc-shaped member 61. As best shown in FIG. 6, pins 61a, 61b are mounted on the disc-shaped member 61, and pins 62a, 62b are mounted on the gear 62, with a coil spring 61c being connected between the pins 61a, 62a and a coil spring 61d between the pins 61b, 62b. When the gear 62 is rotated in a normal direction or a reverse direction, the disc-shaped member 61 and the support member 38 are rotated through the coil springs 61c, 61d. The gear 62 is rotated by a motor 64 through a double gear 63, a worm 63b, toothed pulleys 63c, 63d, and a toothed belt 63e.

An engaging pin 38b projects from the lefthand end of the support member 38. The support member 38 can be positioned selectively in two limit positions (hereinafter referred to as normal and inverted positions) reached thereby when rotated in the normal and reverse directions, when the engaging pin 38b engages selectively a pair of stoppers 67a, 67b fixed to the player housing 2.

The disc-shaped member 61, the coil springs 61c, 61d, the gear 62, the double gear 63a, the worm 63b, the toothed pulleys 63c, 63d, the toothed belt 63e, the motor 64, the stoppers 67a, 67b, and related minor components jointly constitute a driving means for rotating the support member 38 on which the playback means including the turntable 37 is supported. The driving means, the support member 38, and the pivotal support mechanism including the bearings 40, 41 and pivotally supporting the support member 38 jointly serve as a playback means moving mechanism for angularly moving the playback means between the first position corresponding to the lower surface of a disc having reached the playback position and the second position corresponding to the upper surface of the disc.

The disc carrier surface of the turntable 37 when the playback means is in the first position, i.e., when the support member 38 is in the normal position, and the disc carrier surface of the turntable 37 when the playback means is in the second position, i.e., when the support member 38 is in the inverted position are spaced from each other by a distance which is equal to the thickness t of the disc 22 (see FIGS. 1 and 12). As shown in FIGS. 4 and 12, a median plane of the thickness of the disc 22 placed on the turntable 37 and the center of rotation of the turntable 37 intersect at a point through which the pivot axis 38a of the support member 38 passes. This arrangement allows the disc on the turntable 37 to be in the same position when the playback means is in the first and second positions.

As shown in FIG. 6, the disc carrier surfaces of the trays 23, 24 juxtaposed with each other on the carrier 4 are spaced from each other by a distance a. As is apparent from FIGS. 8(b) and 9(b), the staircase-shaped cam slots 14a, 15a defined respectively in the movable members 14, 15 for intermittently moving the trays 23, 24 with the movable chassis 13 in the vertical direction are profiled such that the amount of downward movement of the movable chassis 13 in a first step is a which is equal to the distance between the disc carrier surfaces of the trays 23, 24, and the amount of downward movement of the movable chassis 13 in a second step is b. With this structure, the vertical positions (in the direction of the arrow Z and the direction opposite thereto) to be assumed by two discs 22 successively transferred onto the turntable 37 by the disc transfer mechanism can easily equalized.

Various detector switches disposed in various locations in the disc player will now be described below.

As shown in FIGS. 4 and 5, detector switches 71, 72 are disposed at a front lefthand position in the player housing 2 and engageable by a portion of the carrier 4 for detecting whether the carrier is in the projected position out of the player housing 2 or in the stored position in the player housing 2.

As illustrated in FIG. 4, four detector switches 73, 74, 75, 76 are disposed on a lefthand rear portion of the carrier 4 for engagement with the movable member 14. When the movable member 14 reciprocably moves in the fore-and-aft direction (the direction of the arrow Y and the direction opposite thereto), the movable chassis 13 carrying the trays 23, 24 is reciprocably moved intermittently in two steps in the vertical direction. The detector switch 76 serves to detect when the movable chassis 13 is in a lower position. The detector switch 74 serves to detect when the movable chassis 13 is in a middle position. The detector switch 74 serves to detect when the movable chassis 13 is positioned intermediate between the lower and middle positions. A detector switch 77 is positioned on a righthand rear portion of the carrier 4 for engaging the other movable member 15. The detector switch 77 serves to detect when the movable chassis 13 reaches an upper position. The detector switch 73 serves to detect when the movable chassis 13 is positioned intermediate between the middle and upper positions. As shown in FIGS. 4 and 5, a detector switch 79 is mounted on the front end of the movable chassis 13 and engageable with an engaging member 78 (FIG. 5) fixed to the player housing 2 for supplementarily detecting when the movable chassis 13 reaches the upper position.

Two detector switches 81, 82 are disposed on a righthand front portion of the movable chassis 13 and engageable with respective portions of the trays 23, 24 for detecting when these trays are positioned at the center of the movable chassis 13 and hence the carrier 4. Two detector switches 83, 84 are disposed on a righthand rear portion of the movable chassis 13 and engageable with respective portions of the trays 23, 24 for detecting when these trays reach the projected position rearward of the carrier 4, i.e., the playback position. Another detector switch 85 is disposed on the righthand rear portion of the movable chassis 13 near the detector switches 83, 84. The detector switch 85 is triggered by engagement with the upper tray 23 when the tray 23 projects rearwardly from the carrier 4 beyond the position where the portion of the tray 23 engages the detector switch 83.

As illustrated in FIG. 4, the support member 38 supporting the playback means supports a detector switch 87 for detecting when the carriage 43 comes near the radially innermost edge of an information recording area on a disc 22, and also supports a photosensor 88 for detecting when a transferred disc 22 is placed on the turntable 37.

As shown in FIG. 6, the motor 64 is supported on a bracket 90 disposed on the lefthand side of the support member 38. Two detector switches 91, 92 are mounted on the bracket 90 for engagement with a projection 61f on the disc-shaped member 61 (FIG. 12) fixed to the lefthand end of the support member 38. The detector switches 91, 92 serve to detect whether the support member 38 is in the normal position or the inverted position, i.e., whether the playback means supported on the support member 38 is in the first position corresponding to the lower surface of the disc or in the second position corresponding to the upper surface of the disc.

Figure 13:
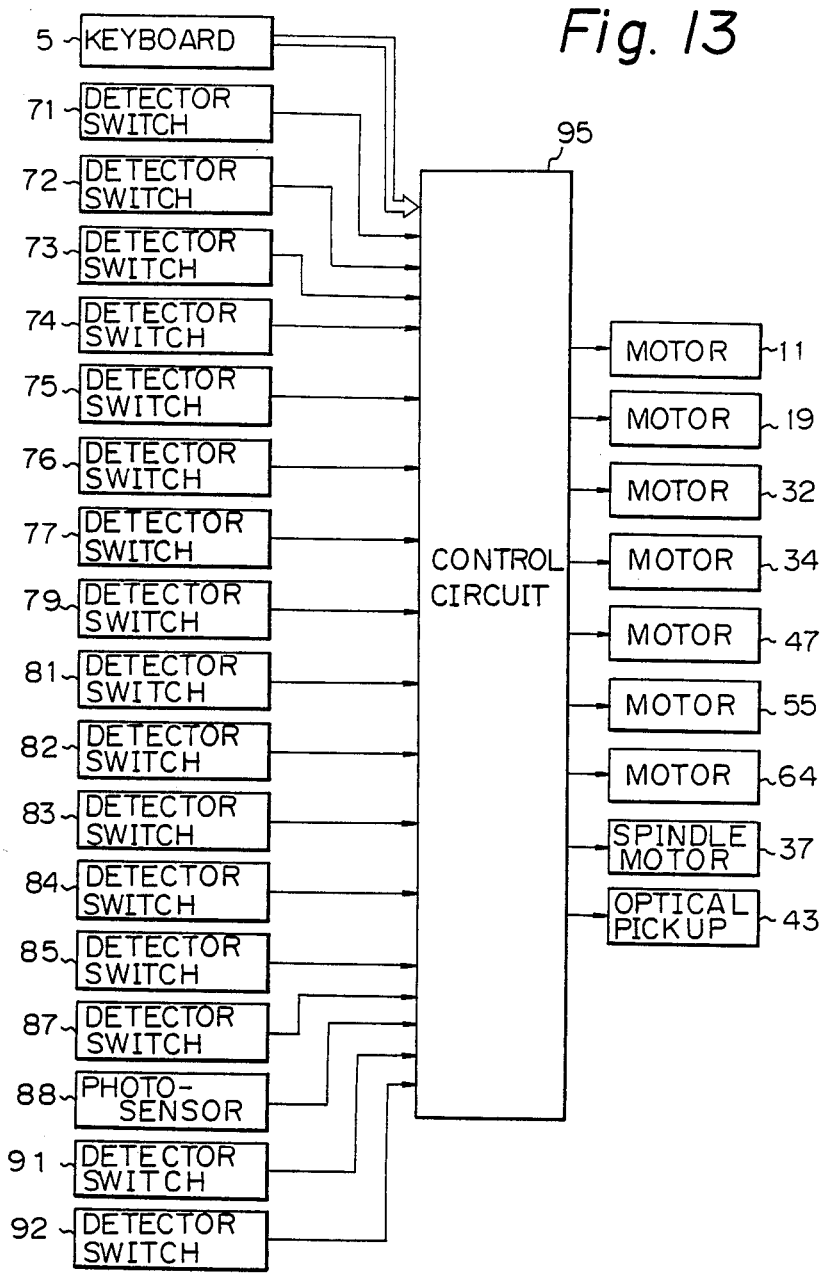
FIG. 13 is a block digram of a drive control system for the disc player shown in FIG. 1.

Detected signals issued by the aforesaid various detector switches are applied to a control circuit 95 shown in FIG. 13 which operates the motors and the pickup means according to the timing described later in response to these applied signals.

A playback process of the front loading disc player thus constructed will be described with reference to FIGS. 14 through 17(f). The operation starts from the condition in which the carrier 4 projects from the player housing 2, as shown in FIG. 1. In this condition, the upper tray 23 is in a position most projected rearwardly (in the direction opposite to the direction of the arrow Y) from the carrier 4.

As shown in FIG. 1, discs 22 to be played back are placed respectively on the trays 23, 24 projecting from the player housing 2, and then the keyboard 5 is operated upon to start playing back the discs.

Figure 14:
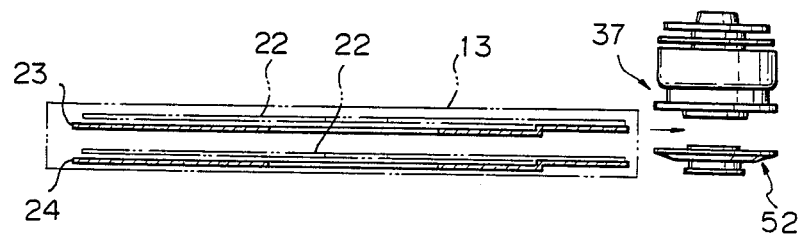
FIGS. 14 through 16 are views explanatory of operation of the disc player shown in FIGS. 1 through 15.

As shown in FIGS. 17(a) through (f), when a disc playback starting command is given, a step S3 confirms whether the playback means including the turntable 37 is in the normal position or not. Then, the motor 11 is rotated in the normal direction in a step S6 to store the carrier 4 with the trays 23, 24 positioned above back into the player housing 2. Immediately before the carrier 4 reaches the stored position, the motor 32 is rotated in the reverse direction in a step S9 to move the upper tray 23 forwardly a prescribed distance from the above position so that the upper tray 23 is positioned in the playback position directly above the turntable 37. The lower trays 24 is positioned centrally in the carrier 4, i.e., in the stored position. Thereafter, the motor 19 is rotated in the normal direction in a step S12 to lower the trays 23, 24 together with the movable chassis 13 carrying them from the upper position to the lower position thus placing the disc 22 from the upper tray 23 onto the turntable 37. The motor 55 is rotated in the normal direction in a step S16 to clamp the disc 22, and then the motor 47 is rotated in a step S19 to start moving the carriage 43 carrying the optical pickup mean for playing back the lower side of the disc 22. After the lower side of the disc 22 has been played back, the disc 22 is unclamped in a step S27, and the motor 19 is rotated in the reverse direction in a step S29 to move the movable chassis 13 to the middle position. The disc 22 is now transferred from the turntable 37 to the upper tray 23. The upper tray 23 carrying the disc 22 again is returned to the position directly above the carrier 4 by reversing the motor 32 in a step S32. Then, the upper side of the disc 22 on the upper tray 23 starts being played back in the following manner:

The motor 64 is rotated in the normal direction in a step S35 to rotate the playback means including the turntable 37 into the inverted position as shown in FIG. 14. At the same time, the motor 19 is rotated in the normal direction in a step S38 to lower the movable chassis 13 into the lower position. Thereafter, the motor 32 is rotated in the normal direction in a step S41 to move the upper tray 23 into the playback position to position the disc 22 on the upper tray 23 directly below the turntable 37. Then, the motor 19 is reversed in a step S44 to elevate the movable chassis 13 to a position intermediate between the lower and middle positions, after which the motor 55 is rotated in the normal direction in a step S47 to clamp the disc 22. Therefore, when the playback means is in the inverted position for playing back the upper side of the disc 22, the tray 23 together with the movable chassis 13 carrying the same is moved closely to the turntable 37, and thereafter the disc 22 is clamped. After completion of the clamping of the disc 22, the upper side of the disc 22 is played back.

After the upper side of the disc 22 has been played back, the motor 55 is reversed in a step S58 to unclamp the disc 22. In response to the disc unclamping operation, the disc 22 which has been pressed against the turntable 37 is transferred onto the upper tray 23. Thereafter, the motor 32 is reversed to return the upper tray 23 directly above the carrier 4.

Figure 15:
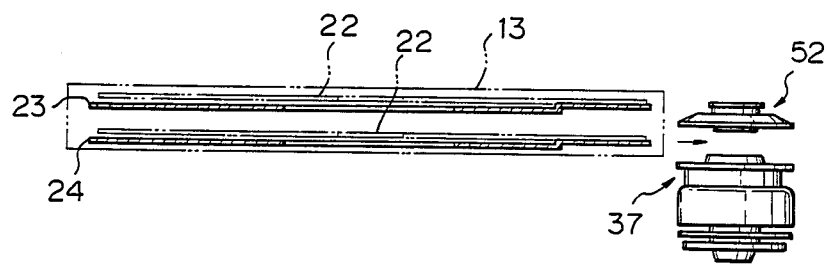

Then, the lower side of the disc placed on the lower trays 24 is played back as follows:

A step S64 confirms whether the playback means is returned to the normal position as shown in FIG. 15 or not. Then, the motor 19 is reversed in a step S70 to lift the movable chassis 13 into the upper position. The motor 34 is rotated in the normal direction in a step S73 to move the lower tray 24 into the playback position directly above the turntable 37. Subsequently, the motor 19 is rotated in the normal direction in a step S76 to lower the movable chassis 13 into the middle position for thereby placing the disc 22 from the lower tray 24 onto the turntable 37. The motor 55 is rotated in the normal direction in a step 83 to clamp the disc 22, and the motor 47 is also rotated in the normal direction in a step S87 to start moving the carriage 43 to play back the lower side of the disc 22. After the lower side of the second disc 22 has been played back, the disc 22 is unclamped, and the motor 19 is reversed in a step S97 to move the movable chassis 13 upwardly into the upper position in a step S98. The upward movement of the movable chassis 13 transfers the disc 22 from the turntable 37 onto the lower tray 24. The motor 34 is reversed in a step S100 to return the lower tray 24 carrying the disc 22 again to the position directly above the carrier 4.

Then, the upper side of the disc 22 on the lower tray 24 is played back in the manner described below.

Figure 16:
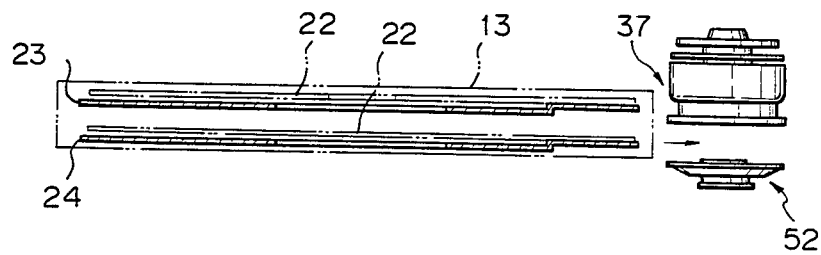
Figure 17A:
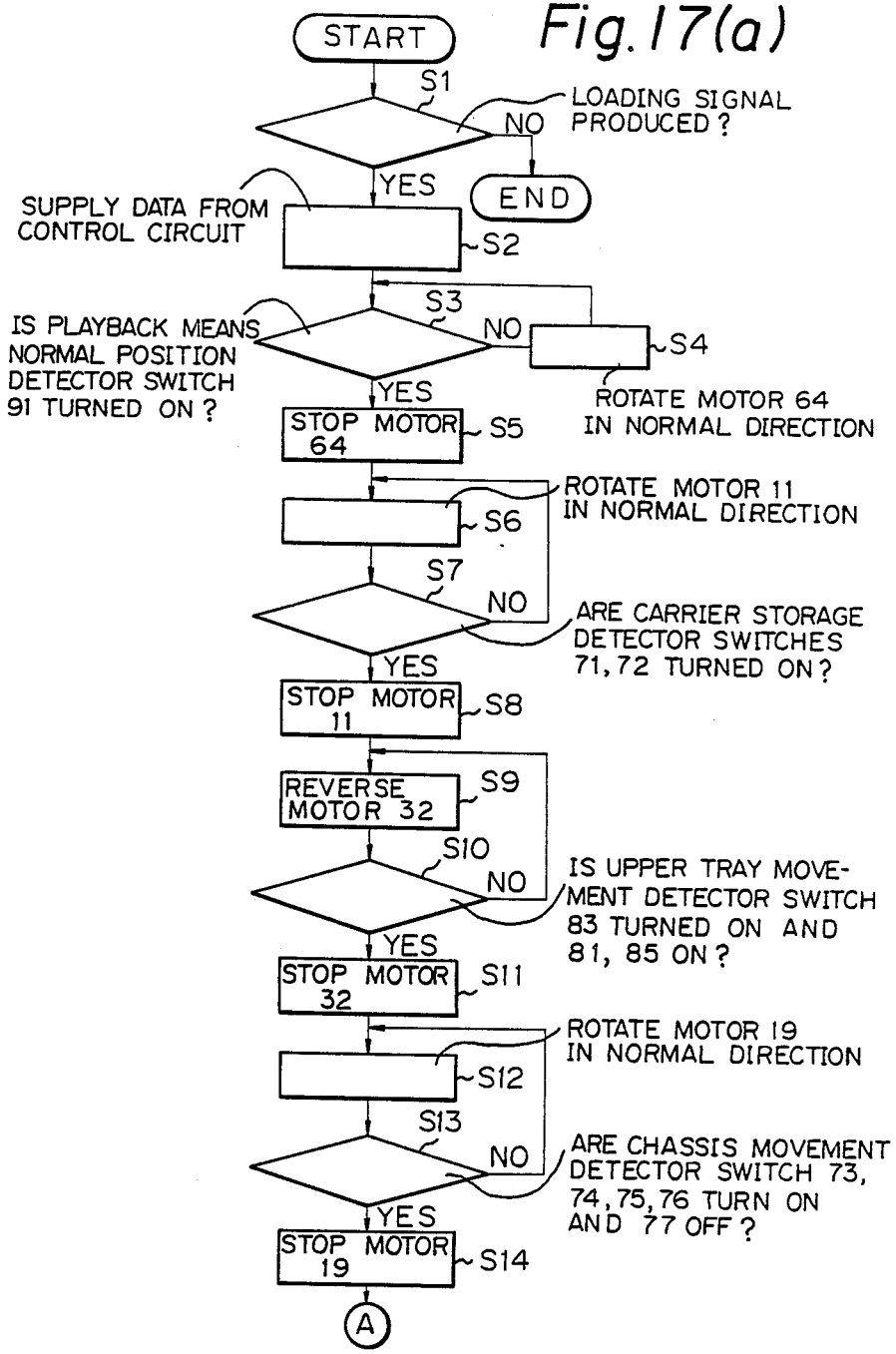
FIGS. 17(a) through 17(k) are flowcharts of operation of the disc layer shown in FIG. 1.
Figure 17B:
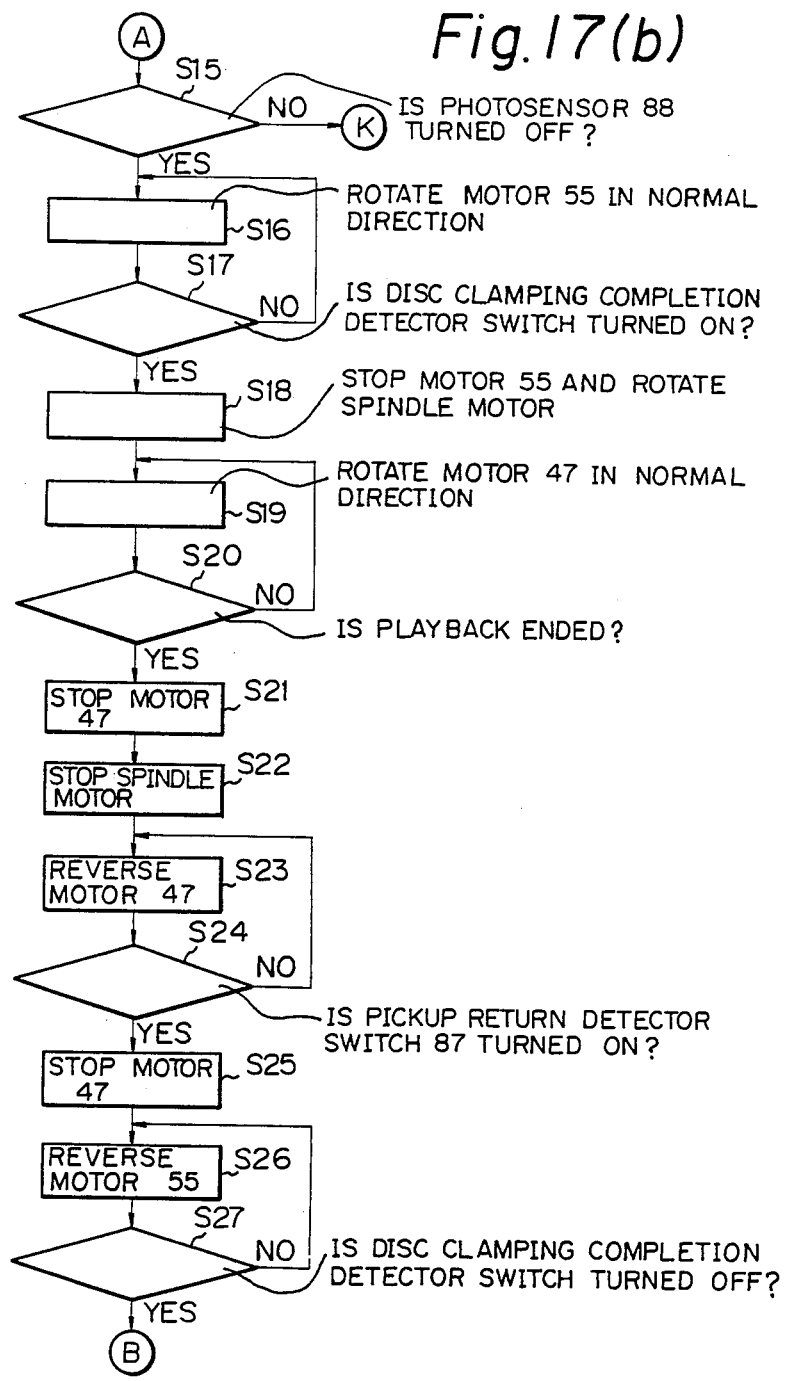
Figure 17C:
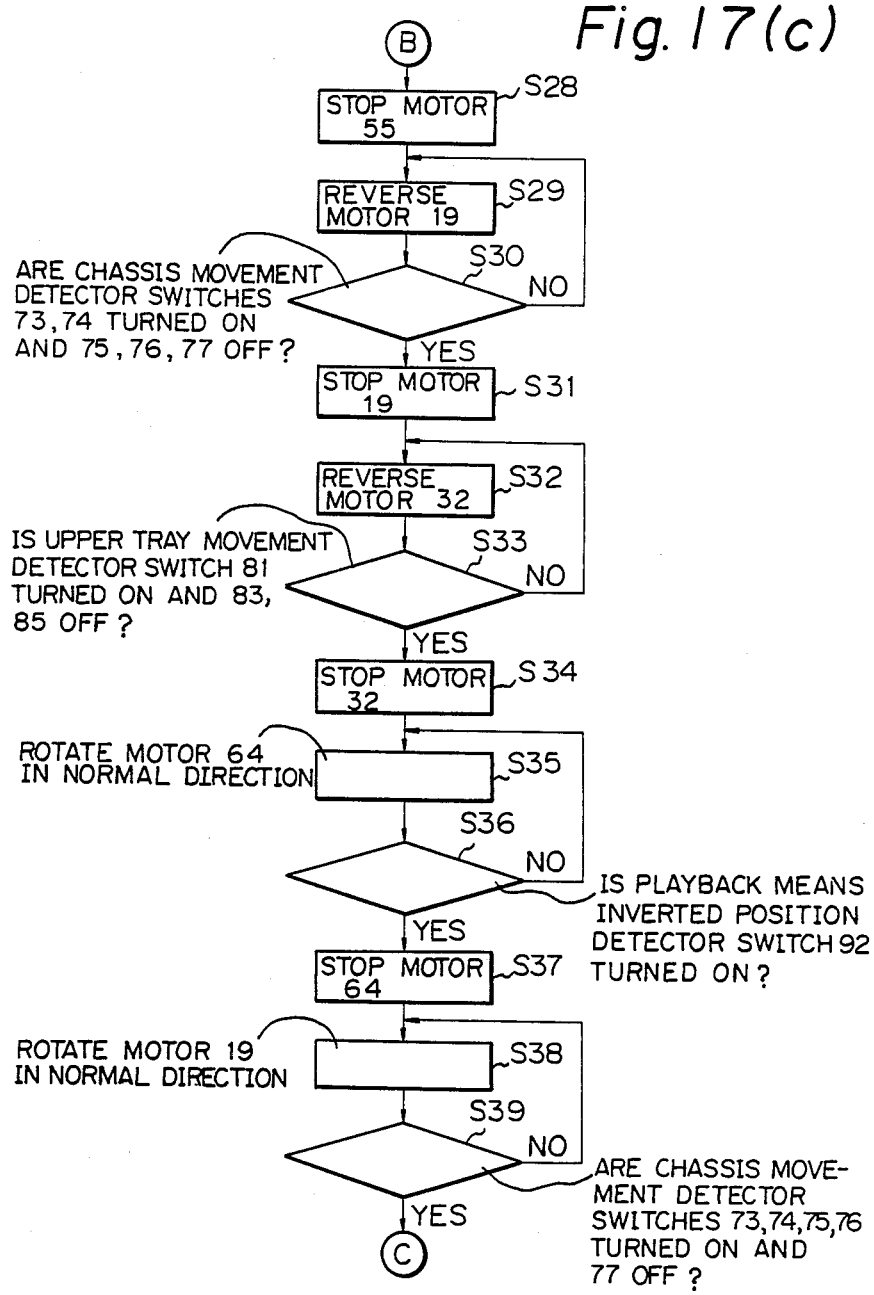
Figure 17D:
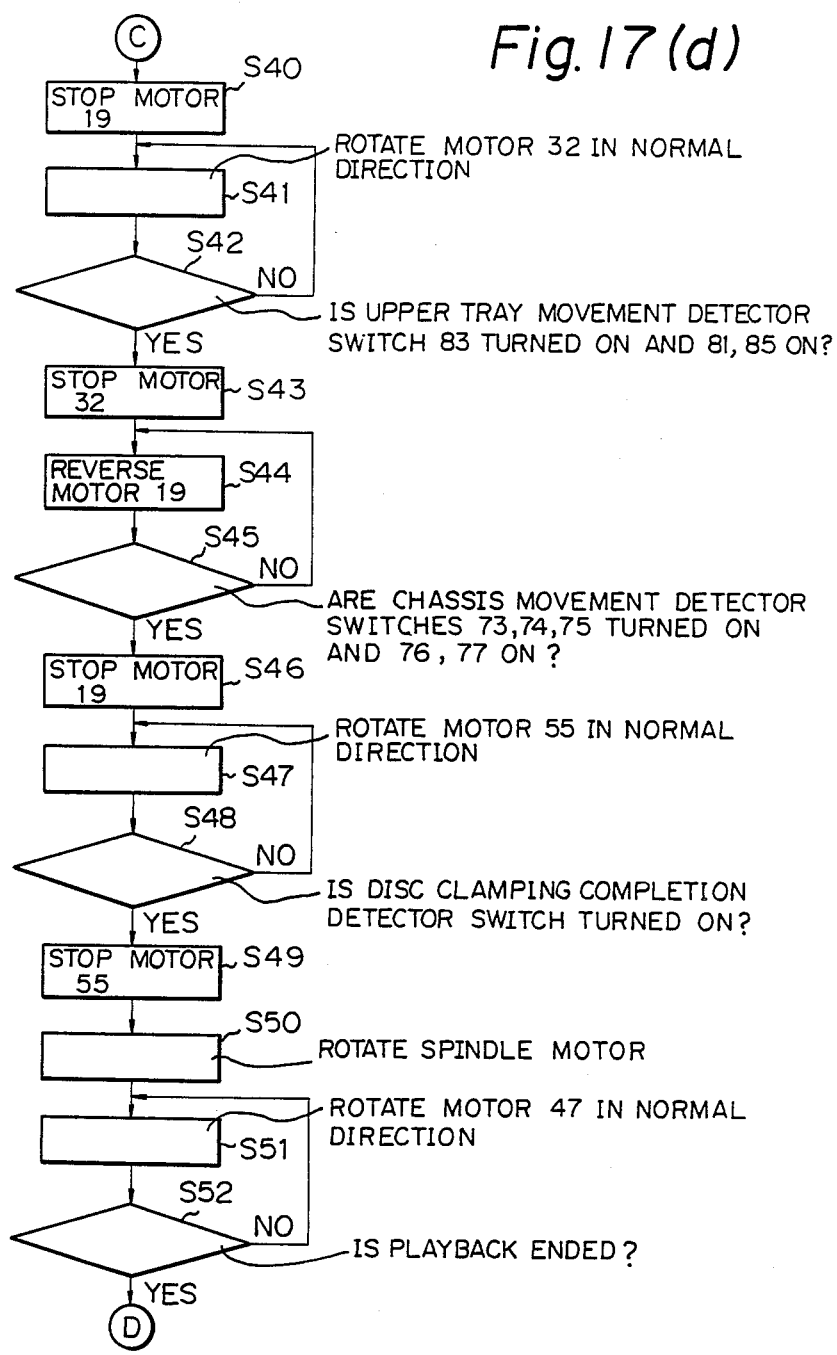
Figure 17E:
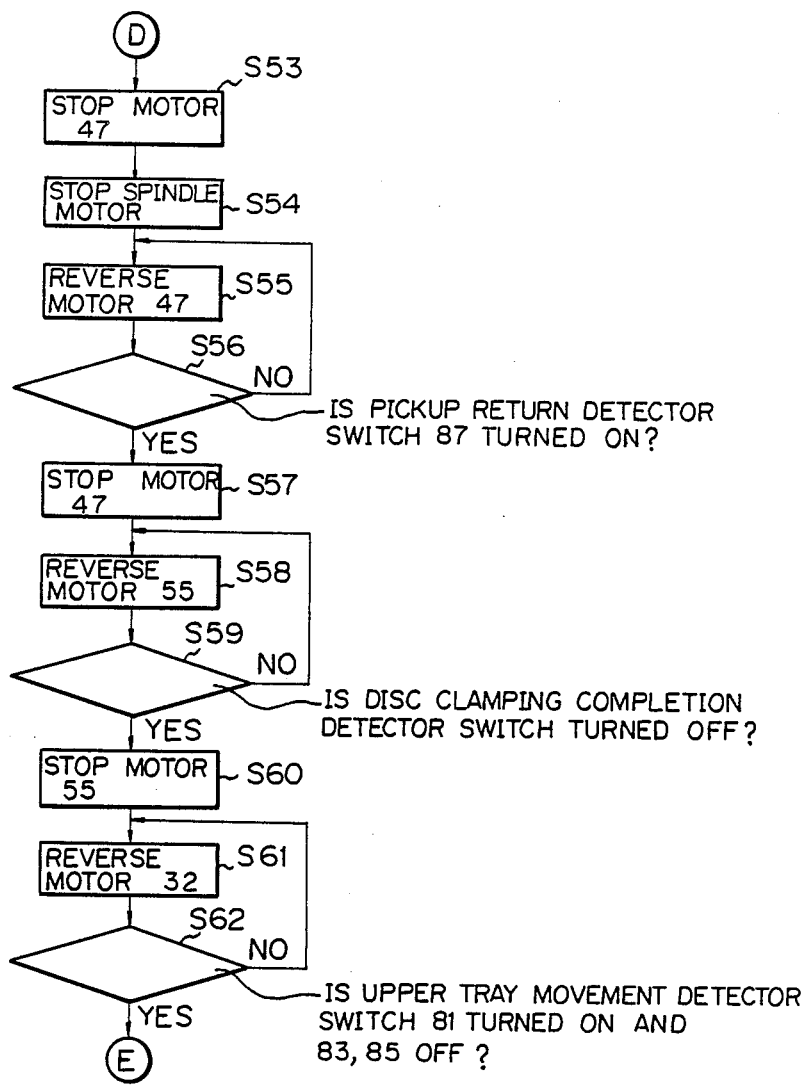
Figure 17F:
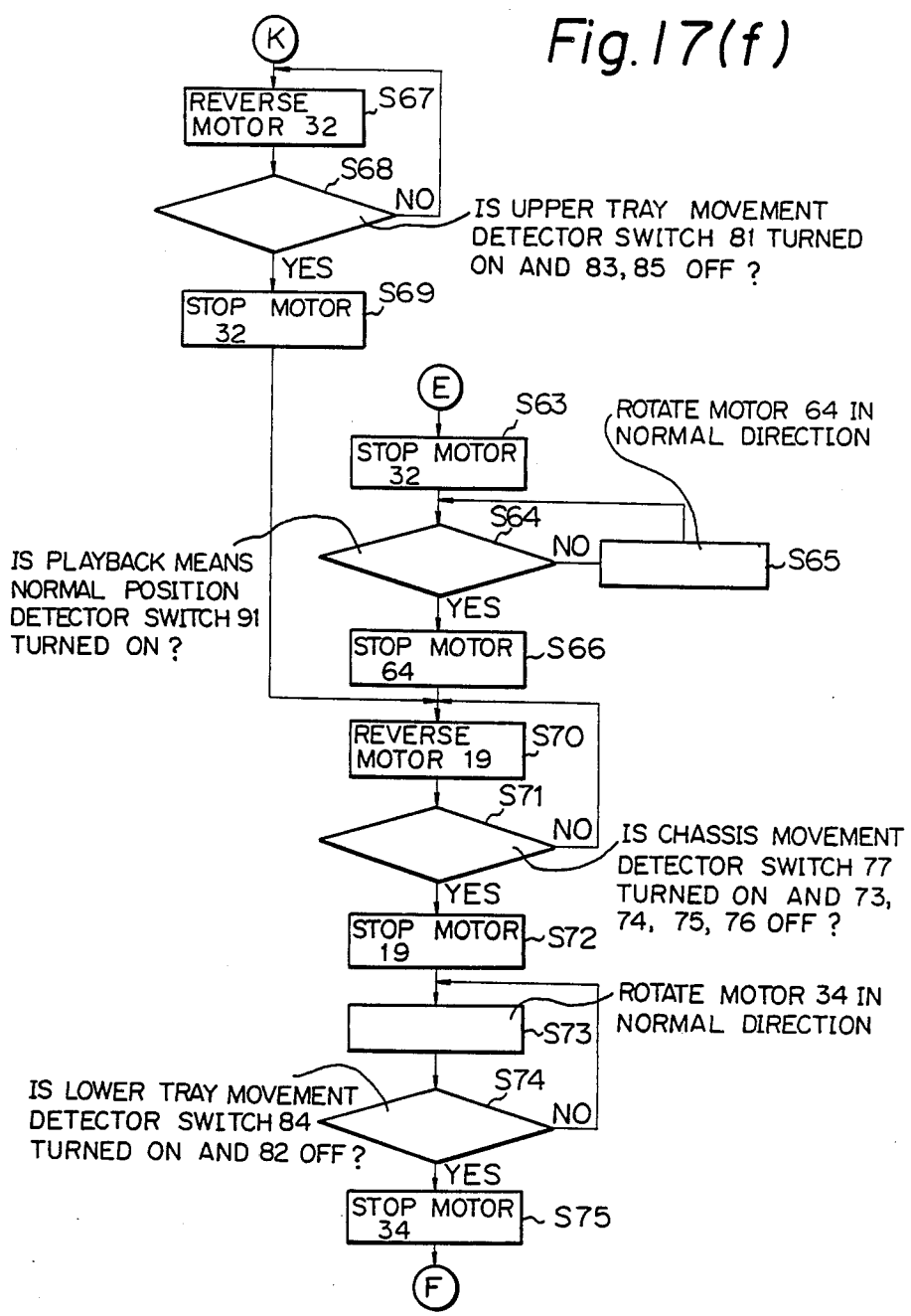
Figure 17G:
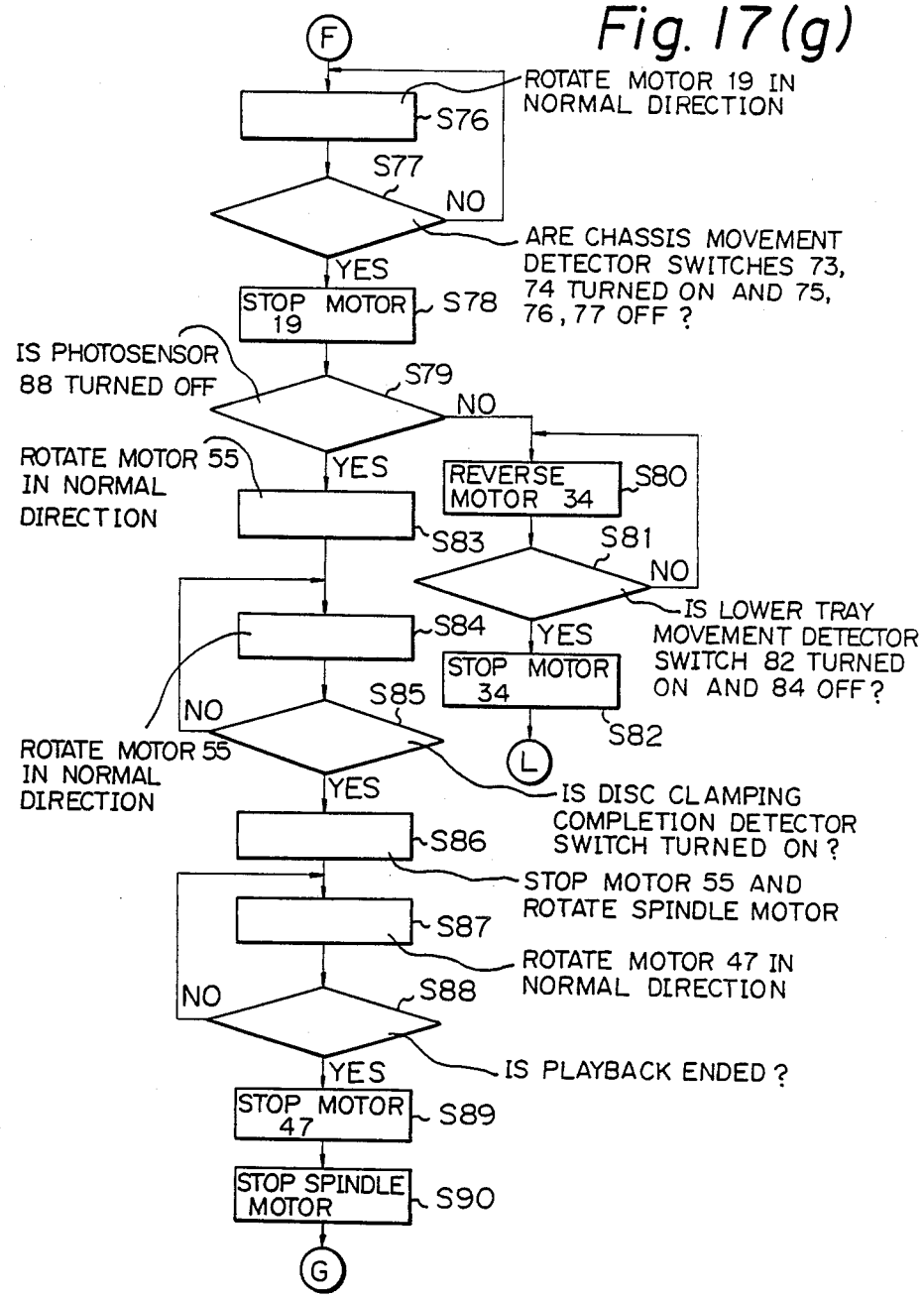
Figure 17H:
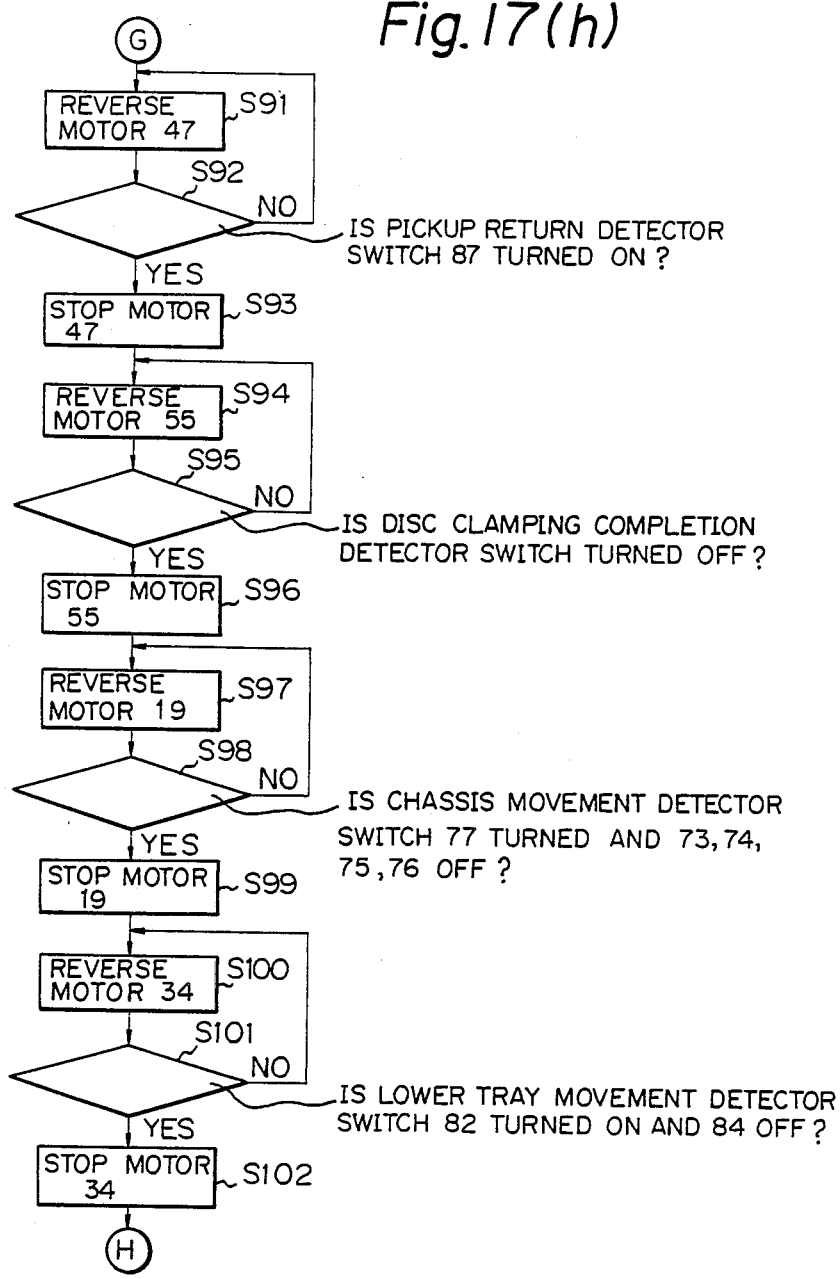
Figure 17I:
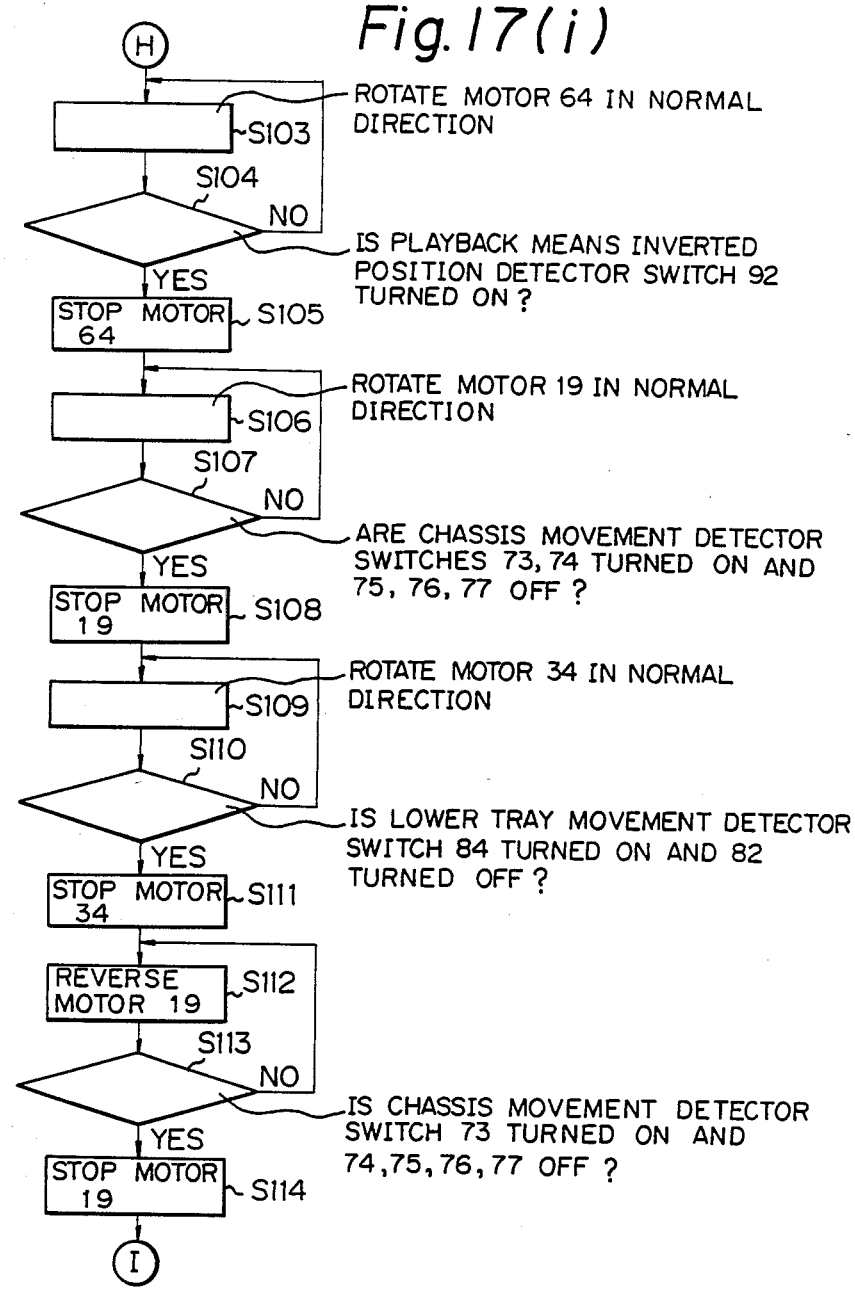
Figure 17J:
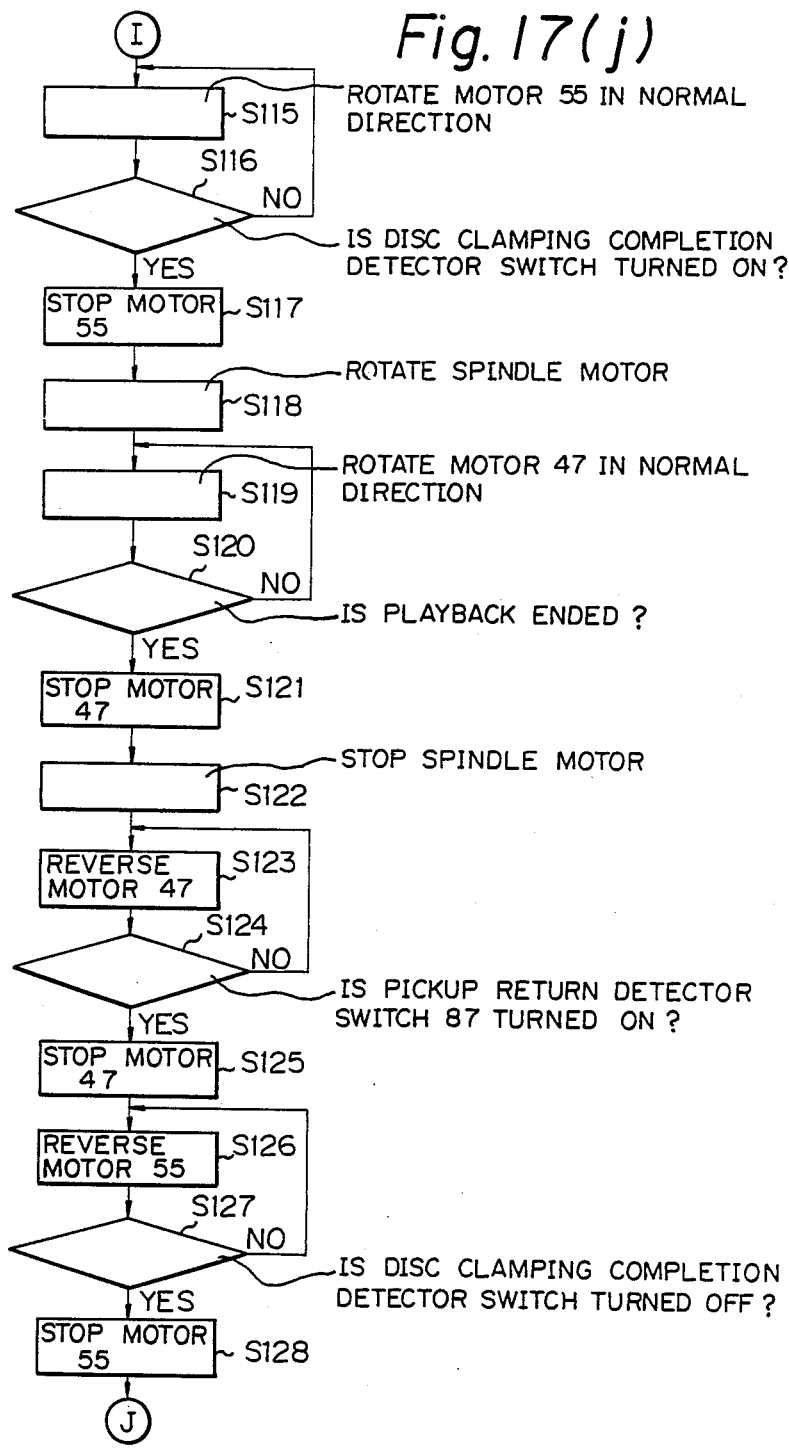
Figure 17K:
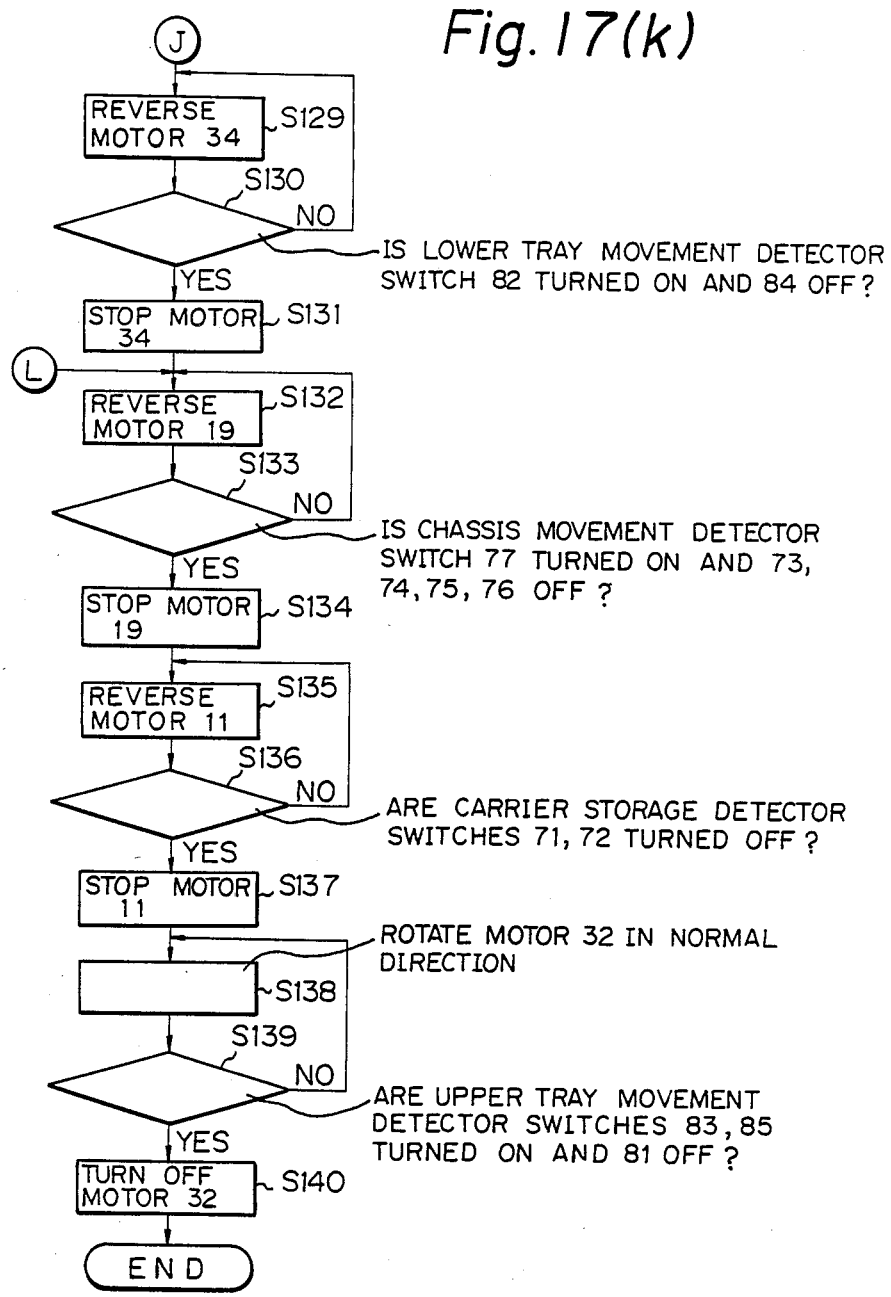

The motor 64 is rotated in the normal direction in a step S103 to turn the playback means including the turntable 37 into the inverted position as shown in FIG. 16, and the motor 19 is simultaneously rotated in the normal direction in a step S106 to lower the movable chassis 13 into the middle position. Then, the motor 34 is rotated in the normal direction in a step S109 to move the lower tray 24 directly above the turntable 37. Thereafter, the motor 19 is reversed in a step S112 to elevate the movable chassis 13 to the position intermediate between the upper and middle positions. The motor 55 is rotated in the normal direction in a step S115 to clamp the disc 22, and the spindle motor is rotated in a step S118 and the motor 47 is rotated in a step S119 to move the carriage 43 for thereby playing back the upper side of the disc 22.

Upon completion of the playback of the upper side of the second disc 22, the motor 55 is reversed in a step S126 to unclamp the disc 22. The disc 22 which has been held against the turntable 37 is returned back onto the lower tray 24. The motor 34 is thereafter reversed to move the lower tray 24 directly above the carrier 4.

After both sides of the two discs have been played back, the motor 19 is reversed in a step S132 to move the movable chassis 13 which carries the trays 23, 24 to the upper position. Thereafter, the motor 11 is reversed in a step S135 to cause the carrier 4 together with the movable chassis 13 and the trays 23, 24 to project out of the player housing 2. The motor 32 is then rotated in the normal direction in a step S138 to move only the upper tray 23 rearwardly, so that the components of the disc player now assume the position of FIG. 1.

A front loading disc player according to a second embodiment of the present invention will hereinafter be described with reference to FIGS. 18 through 27.

Figure 18:
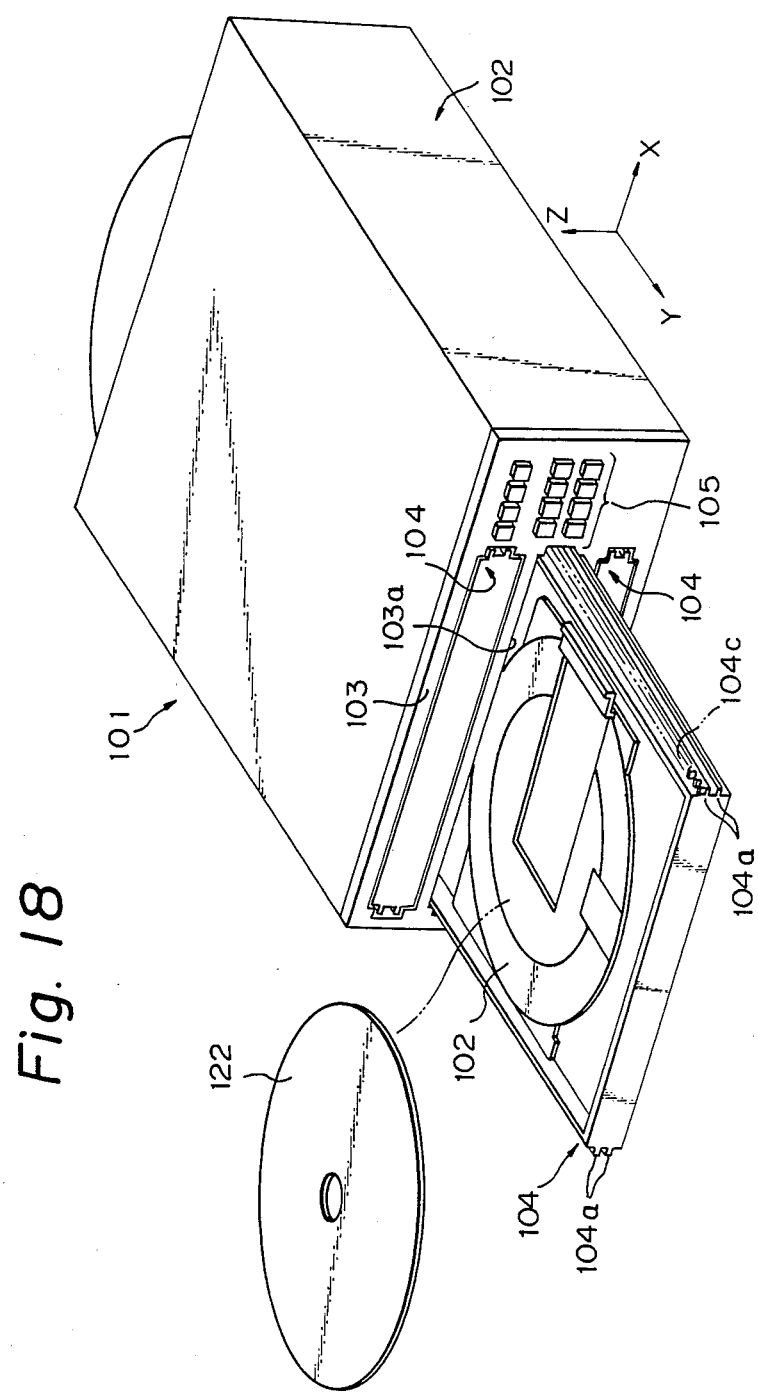
FIG. 18 is a perspective view of a front loading disc player according to a second embodiment of the present invention.

As shown in FIG. 18, the front loading disc player, generally denoted at 101, has a player housing 102 including a front panel 103 with a laterally elongate rectangular slot 103a defined therein through which three carriers 104 of identical shape and dimensions can project out of the player housing 102. More specifically, the rectangular slot 103a is elongate laterally in the direction of the arrow X (leftward direction) and the direction opposite thereto (rightward direction), both across the direction of the arrow Y (forward direction) in which the front panel 103 faces. The direction of the arrow Z is an upward direction normal to the directions of the arrows X, Y. A keyboard 105 for controlling operation of the disc player is disposed on the front panel 103 on the lefthand side of the slot 103a. The three carriers 104 are arranged side by side in a first or vertical direction (the direction of the arrow Z and the direction opposite thereto).

Figure 19:
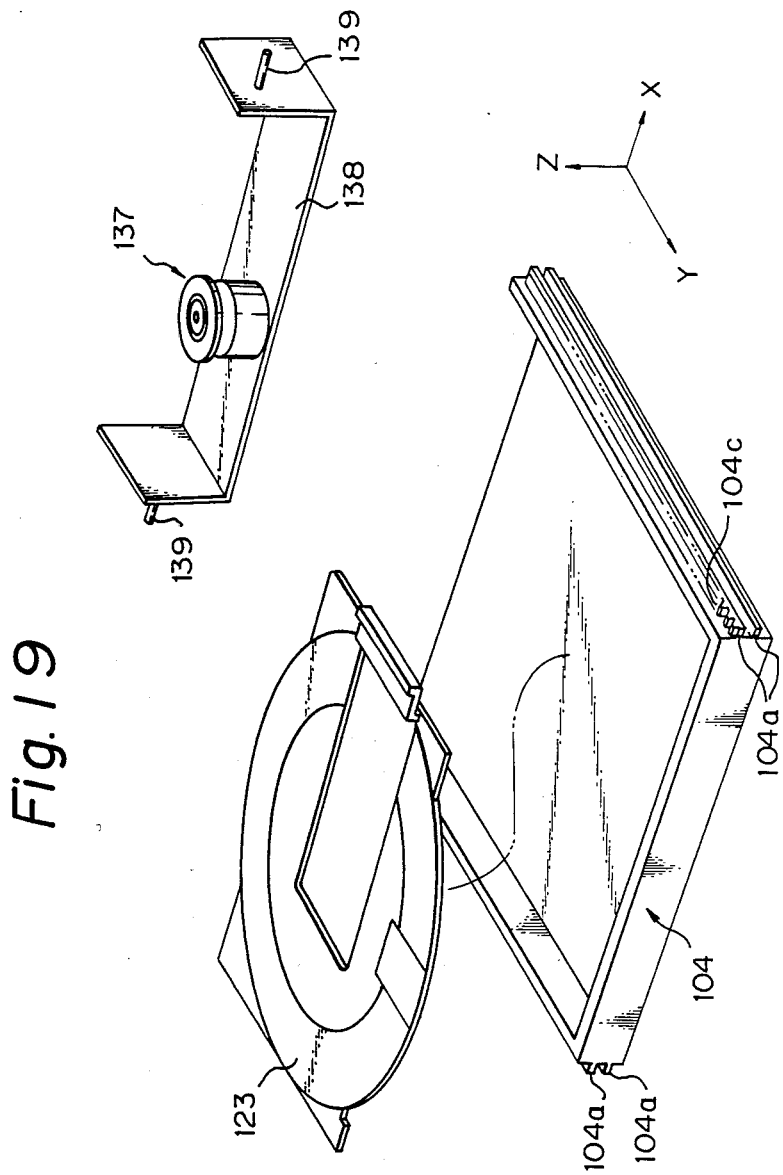
FIG. 19 is an exploded perspective view of main components of an internal structure of the front loading disc player illustrated in FIG. 18.
Figure 20:
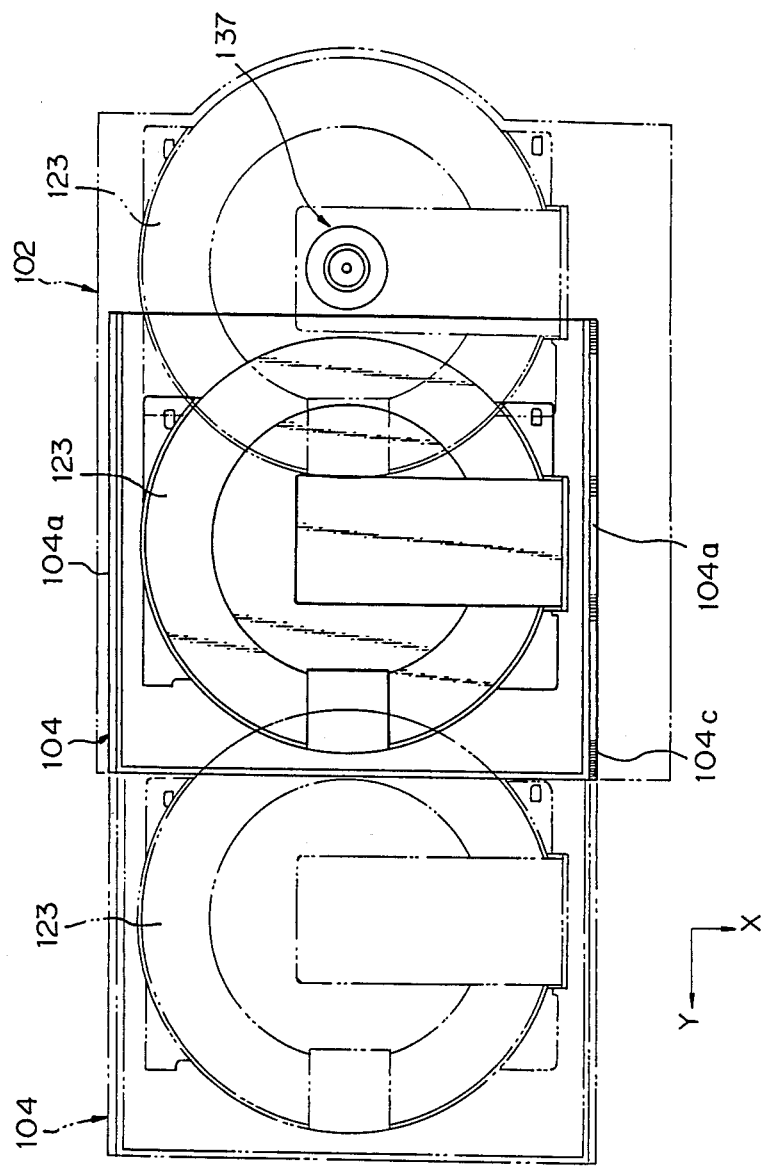
FIG. 20 is a plan view of the internal structure of the front loading disc player illustrated in FIG. 18.
Figure 21:
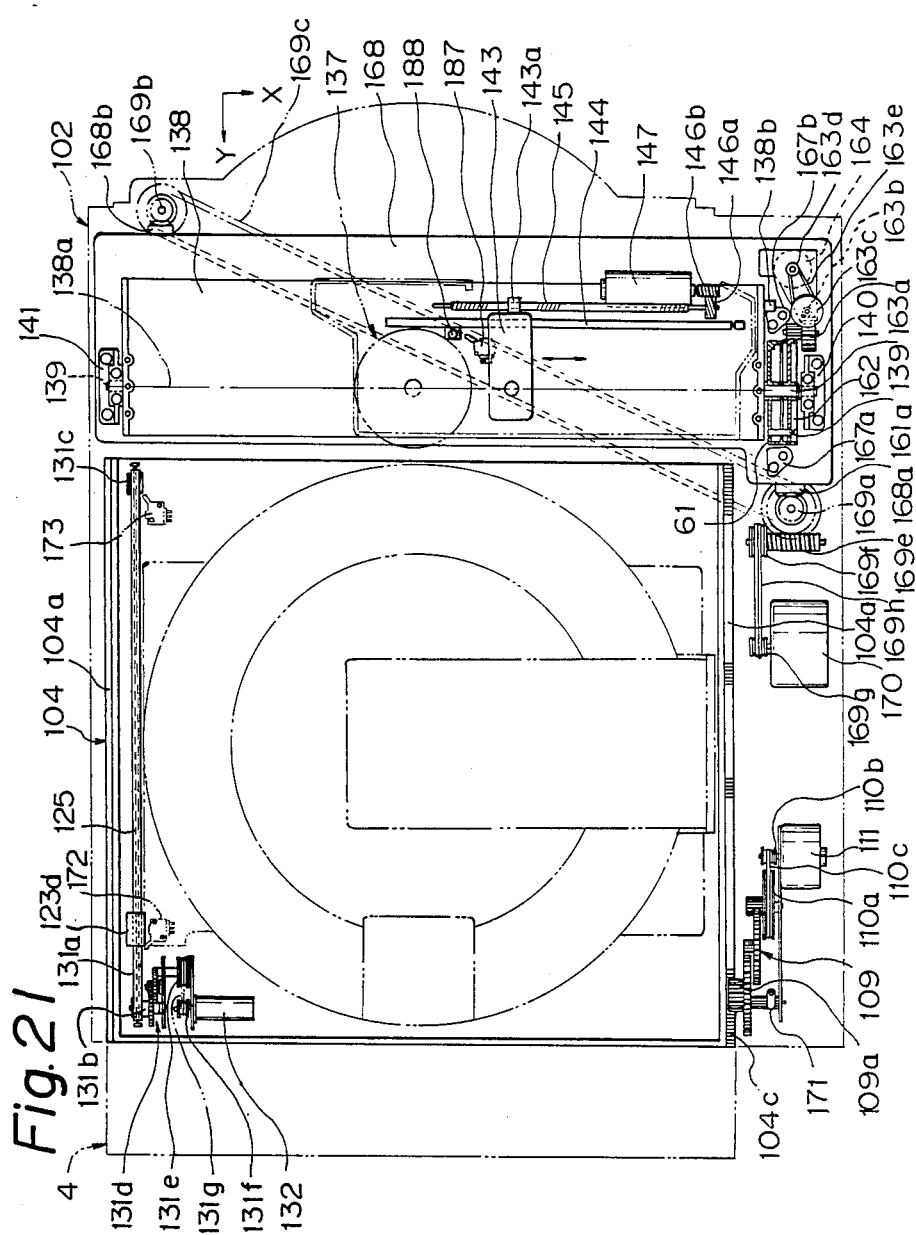
FIG. 21 is a plan view, partly in cross section, of the internal structure of FIG. 20.
Figure 22:
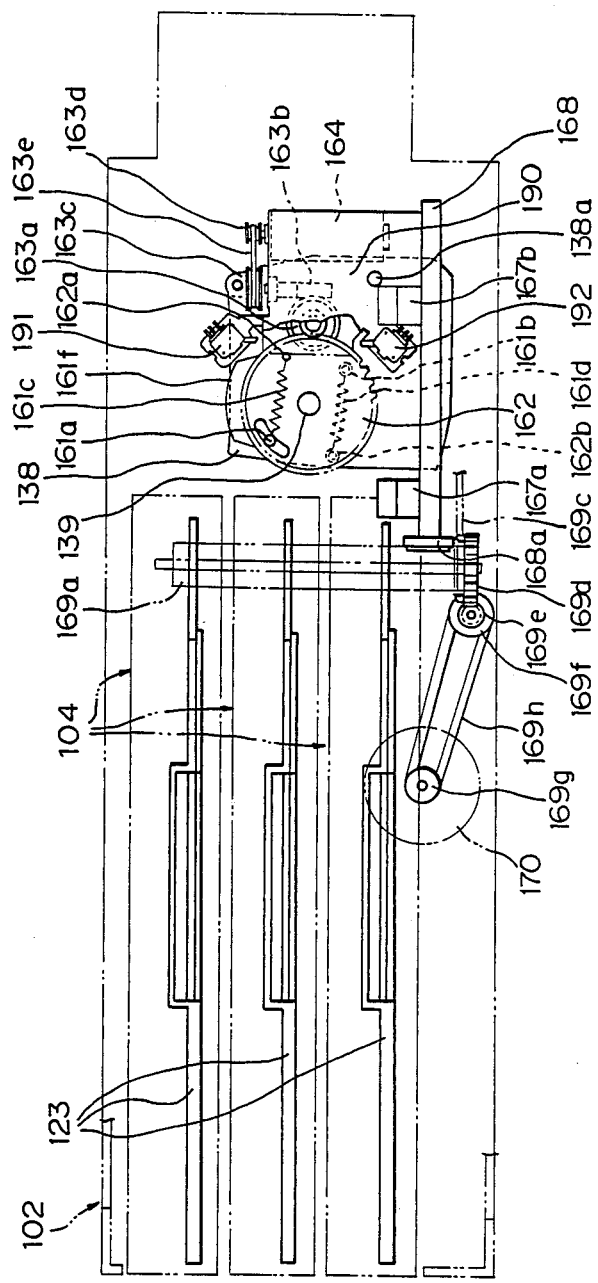
FIG. 22 is a side elevational view of the internal structure of FIG. 20.

As shown in FIG. 19, each carrier 104 is the form of a hollow rectangular parallelepiped with its upper and rear sides open. As indicated by the solid lines and the two-dot-and-dash lines in FIG. 20, the carrier 104 is movable in a second or fore-and-aft direction (the direction of the arrow Y and the direction opposite thereto) between a stored position in the player housing 102 and a projected position out of the player housing 2. More specifically, as shown in FIG. 21, the carrier 104 has two pairs of parallel longitudinal ridges or guide rails 104a extending in the fore-and-aft direction on opposite outer lateral sides thereof. Guide rollers (not shown) rollingly ride between the ridges 104a in each pair. The carriers 104 are also shown in FIG. 22.

The upper one of the ridges 104a in the pair on the lefthand side of the carrier 104 has a rack 104c disposed on and extending over the entire upper surface thereof. As shown in FIG. 21, the rack 104c is held in mesh with a gear 109a which is a final gear of a speed reducer gear mechanism 109. The carrier 104 is moved by a motor 111 through the speed reducer gear mechanism 109, toothed pulleys 110a, 110b, and a toothed belt 110c trained around the tooled pulleys 110a, 110b. The speed reducer gear mechanism 109, the toothed pulleys 110a, 110b, the toothed belt 110c, and the motor 111 jointly serve as a carrier driving means for moving the carrier 104. The carrier driving means is provided for each of the three carriers 104.

A tray 123 for carrying a disc 122 (FIG. 18) is placed on each of the carriers 104.

Figure 24:
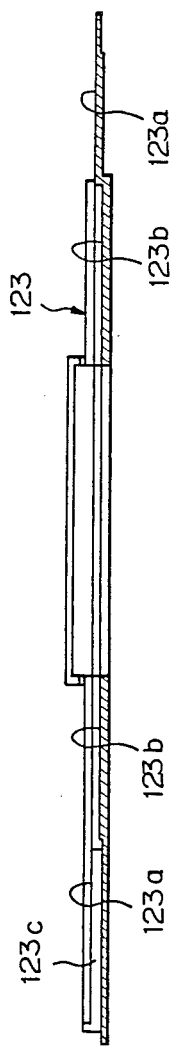

FIGS. 23(a) through 23(c) and 24 show the tray 123 in detail, FIG. 24 being a cross-sectional view taken along line XXIV—XXIV of FIG. 23(a). The tray 123 has a first disc carrier surface 123a having a diameter D1 for carrying a disc 122 (FIG. 18) of a diameter of about 30 cm, and a second disc carrier surface 123b having a diameter D2 for carrying a disc (not shown) of a diameter of about 20 cm, the first and second disc carrier surfaces 123a, 123b being concentric with each other. As is clear from FIG. 24, the second disc carrier surface 123b is defined as a recess with respect to the first disc carrier surface 123a, the second disc carrier surface 123b having a depth greater than the thickness of the disc to be carried on the second disc carrier surface 123b. The tray 123 has a recess 123c defined in a front end thereof for inserting a finger therethrough below the disc carried on the first or second disc carrier surface 123a or 123b to remove the disc. The recess 123c has a depth from the first disc carrier surface 123a, the depth being larger than the depth of the second disc carrier surface 123b.

The tray 123 is movable with respect to the carrier 104 on which it is carried, in the second or fore-and-aft direction (the direction of the arrow Y and the direction opposite thereto). As shown in FIG. 21, a righthand end of the tray 123 slidably engages a guide shaft 125 disposed on a righthand portion of the carrier 104 and extending in the fore-and-aft direction. As illustrated in FIGS. 23(a) through 23(c), a lefthand end of the tray 123 has steel balls 123e and hemispherical projections 123f which are slidably held against guide members (not shown) no the lefthand side of the carrier 104 for smoothly guiding the lefthand side of the carrier 104.

As shown in FIG. 21, a pair of pulleys 131b, 131c with a wire 131a trained therearound is mounted on the righthand end of the carrier 104, the wire 131a being coupled to the tray 123. The pulley 131b is rotatable by a motor 132 through a speed reducer gear mechanism 131d, toothed pulleys 131e, 131f, and a toothed belt 131g trained therearound. When the motor 132 is rotated in one (normal) direction and then the other (reverse) direction, the tray 123 is reciprocably moved in the fore-and-aft direction.

The wires 131a, 133a, the pulleys 131b, 131c, the speed reducer gear mechanism 1231d, the toothed pulleys 131e, 131f, the toothed belt 131g, and the motor 132 jointly constitute a tray driving means for moving the tray 123 with respect to the carrier 104. As shown in FIG. 20, the tray 123 is movable between a first position directly above the carrier 104 and a second position rearward of the carrier 104. The tray driving means, the tray 123, the carrier 4, and the carrier driving means as described above jointly constitute a disc transfer mechanism for carrying a disc 122 (FIG. 18) to be played and transferring the disc 122 into a playback position in the player housing 102.

As described above, the carrier 104 is movable between the projected and stored positions in the fore-and-aft direction with respect to the player housing 102, and the tray 123 disposed on the carrier 104 is movable between the first and second positions in the fore-and-aft direction with respect to the carrier 104. Therefore, as shown in FIG. 20, the tray can assume the projected position out of the player housing 102, the stored position in the player housing 102, and also the playback position way back in the player housing 102.

Figure 25:
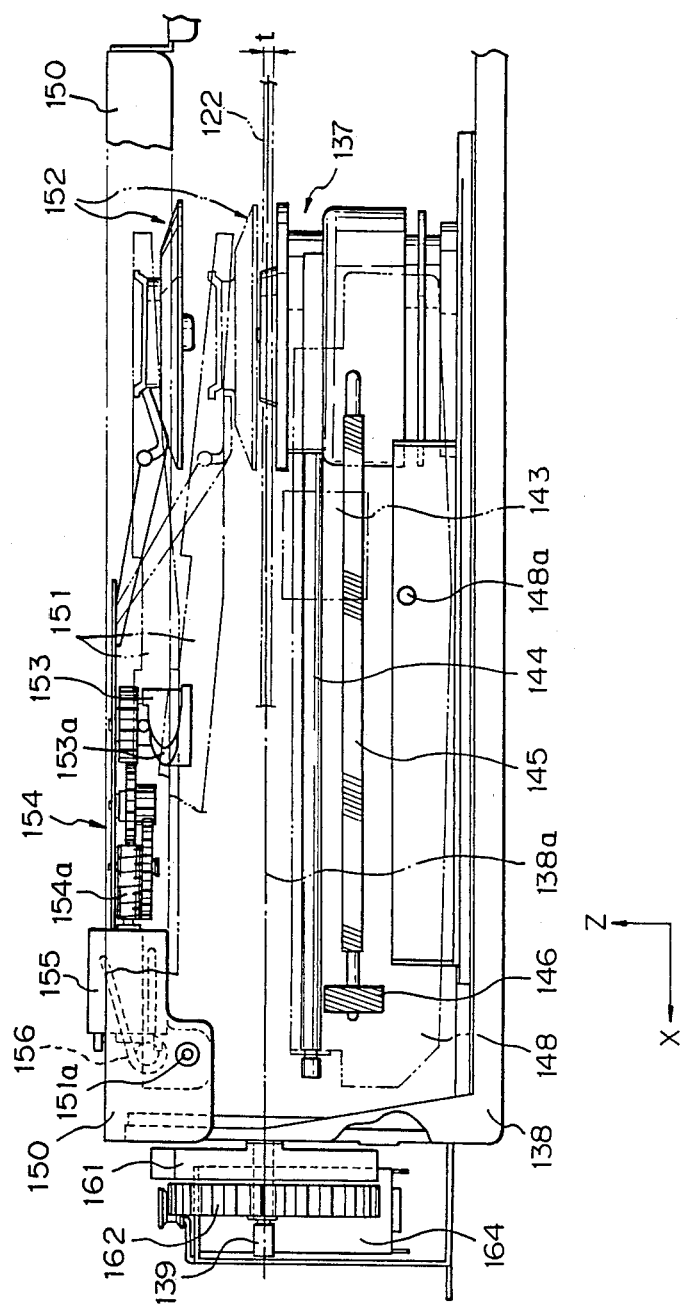

As shown in FIGS. 19 through 21 and 25, a turntable 137 is disposed way back in the housing 102 and supported by a support member 138 extending laterally in the player housing 102. The support member 138 has a pair of support shafts 139 extending laterally from the opposite ends thereof and rotatably supported by a pair of respective bearings 140, 141 fixedly mounted in a vertically movable base (described later). As shown in FIGS. 21 and 25, a carriage 143 supporting an optical pickup means is mounted on the support member 138 through a guide shaft 144 so as to be movable in the lateral direction (the direction of the arrow X and the direction opposite thereto) along a plane parallel to a disc carrier surface of the turntable 137. The carriage 143 is movable by a carriage driving means comprising a worm 145 meshing with a half nut 143a (FIG. 21) mounted on the carriage 143, a worm wheel 146a for rotating the worm 145 about its own axis, a worm 146b meshing with the worm wheel 146a, and a motor 47 having an output shaft coupled to the worm 146b. As shown in FIG. 25, the carriage 143, the guide shaft 144, the worm 145, and the motor 147 are mounted on a swingable plate 148 swingably disposed on the support member 138 by means of a pin 148a. The swingable plate 148 swings in a plane normal to the disc carrier surface of the turntable 137. There is a drive source for swinging the swingable plate 148 through a tilt-servo means.

As illustrated in FIG. 25, a longitudinal bracket 150 is attached to the support member 138 parallel thereto. To the bracket 150, there is swingably attached an arm 151 through a pin 151a. A disc-shaped presser 152 is rotatably mounted on the free end of the arm 151 for pressing a disc in the playback position against the turntable 137 thereby to clamp the disc in place on the turntable 137. A cam member 153 having a spiral cam surface 153a is rotatably mounted on the longitudinal bracket 150 and held in engagement with the arm 151. In response to rotation of the cam member 153, the arm 151 is caused to swing to move the presser 152 toward or away from the turntable 137. The cam member 153 is rotatable by a motor 155 through a speed reducer gear mechanism 154 including a worm 154a. The arm 151 is normally urged by a spring 156 in a direction to displace the presser 152 toward the turntable 137.

The arm 151, the presser 152, the cam member 153, the speed reducer gear mechanism 154, the motor 155, and the spring 156 jointly serve as a disc clamping mechanism. The disc clamping mechanism, the turntable 137, the optical pickup means, and the tilt-servo means jointly constitute a playback means for playing back discs.

The entire playback means is mounted on the support member 138. As described above, the support member 138 is pivotally supported by a pivotal support mechanism which comprises the support shafts 139 and the bearings 140, 141. Therefore, the playback means can be angularly moved between a position corresponding to the lower surface of a disc 122 which has been transferred into the playback position by the disc transfer mechanism and a position corresponding to the upper surface of the disc.

As shown in FIGS. 21 and 25, the support member 138 has a pivot axis 138a parallel to the direction in which the carriage 143 carrying the optical pickup means moves. With this arrangement, the space in the player housing 102 is effectively utilized while minimizing any dead space therein, and hence the disc player is of a reduced overall size. The pivot axis 138a is perpendicular to the fore-and-aft direction (the direction of the arrow Y and the direction opposite thereto) in which a disc can be transferred. This arrangement is also effective in reducing the overall size of the disc player, particularly its transverse size.

A drive means for rotating the support member 138 which supports the playback means including the turntable 137 will hereinafter be described.

As shown in FIGS. 21, 22, and 25, a disc-shaped member 161 is fitted over the support shaft 139 on the lefthand end of the support member 138 for rotation with the support member 138. A gear 162 is rotatably mounted on the support shaft 139 on the lefthand side of disc-shaped member 161. As best shown in FIG. 22, pins 161a, 161b are mounted on the disc-shaped member 161, and pins 162a, 162b are mounted on the gear 162, with a coil spring 161c being connected between the pins 161a, 162a and a coil spring 161d between the pins 161b, 162b. When the gear 162 is rotated in one (normal) direction or the other (reverse), the disc-shaped member 161 and the support member 138 are rotated through the coil springs 161c, 161d. The gear 162 is rotated by a motor 164 through a double gear 163, a worm 163b, toothed pulleys 163c, 163d, and a toothed belt 163e.

An engaging pin 138b projects from the lefthand end of the support member 138. The support member 138 can be positioned selectively in two limit positions (hereinafter referred to as normal and inverted positions) reached thereby when rotated in the normal and reverse directions, when the engaging pin 138b engages selectively a pair of stoppers 167a, 167b fixed to the vertically movable base.

The disc-shaped member 161, the coil springs 161c, 161d, the gear 162, the double gear 163a, the worm 163b, the toothed pulleys 163c, 163d, the toothed belt 163e, the motor 164, the stoppers 167a, 167b, and related minor components jointly constitute a driving means for rotating the support member 138 on which the playback means including the turntable 137 is supported. The driving means, the support member 138, and the pivotal support mechanism including the bearings 140, 141 and pivotally supporting the support member 138 jointly serve as a first playback means moving mechanism for angularly moving the playback mean between the first position corresponding to the lower surface of a disc having reached the playback position and the second position corresponding to the upper surface of the disc.

The disc carrier surface of the turntable 137 when the playback means is in the first position, i.e., when the support member 138 is in the normal position, and the disc carrier surface of the turntable 137 when the playback means is in the second position, i.e., when the support member 138 is in the inverted position are spaced from each other by a distance which is equal to the thickness t of the disc 122 (see FIGS. 18 and 25). As shown in FIGS. 21 and 25, a median plane of the thickness of the disc 122 placed on the turntable 137 and the center of rotation of the turntable 137 intersect at a point through which the pivot axis 138a of the support member 138 passes. This arrangement allows the disc on the turntable 137 to be in the same position when the playback means is in the first and second positions.

As illustrated in FIGS. 21 and 22, the support member 138 which supports the playback means including the turntable 137 is carried on the vertically movable base, denoted at 168. The vertically movable base 168 is movable in the first or vertical direction (the direction of the arrow Z and the direction opposite thereto). Rack members 168a, 168b are fixed to the lateral ends of the vertically movable base 168, and a pair of vertically extending worms 169a, 169b is held in mesh with the rack members 168a, 168b, respectively. A belt 169c is trained around the worms 169a, 169b so that rotation of the worm 169a causes the other worm 169b to rotate. The worm 169a can be rotated by a motor 170 through a worm wheel 169d, a worm 169e, pulleys 169f, 169g, and a belt 169h trained therearound.

The vertically movable base 168, the rack members 168a, 168b, the worms 169a, 169b, the belt 169c, the worm wheel 169d, the worm 169e, the pulleys 169f, 169g, and the belt 169h jointly serve as a second playback means moving mechanism for moving the support member 138 together with the playback means supported thereon in the first or vertical direction.

Various detector switches disposed in various locations in the disc player will now be described below.

As shown in FIG. 21, a detector switch 171 is disposed at a front lefthand position in the player housing 102 and engageable by a portion of the carrier 104 for detecting whether the carrier is in the projected position out of the player housing 102 or in the stored position in the player housing 102. A detector switch 172 is disposed on a righthand front portion of the carrier 104 and engageable with a portion of the tray 123 for detecting when the tray is positioned at the center of the carrier 104. A detector switch 173 is disposed on a righthand rear portion of the carrier 104 and engageable with a portion of the tray 123 for detecting when the tray reaches the projected position rearward of the carrier 104, i.e., the playback position.

As illustrated in FIG. 21, the support member 138 supporting the playback means supports a detector switch 187 for detecting when the carriage 143 comes near the radially innermost edge of an information recording area on a disc 122, and also supports a photosensor 188 for detecting when a transferred disc 122 is placed on the turntable 137.

As shown in FIG. 22, the motor 164 is supported on a bracket 190 disposed on the lefthand side of the support member 138. Two detector switches 191, 192 are mounted on the bracket 190 for engagement with a projection 161f on the disc-shaped member 161 (FIG. 25) fixed to the lefthand end of the support member 138. The detector switches 191, 192 serve to detect whether the support member 138 is in the normal position or the inverted position, i.e., whether the playback means supported on the support member 138 is in the first position corresponding to the lower surface of the disc or in the second position corresponding to the upper surface of the disc.

Detected signals issued by the aforesaid various detector switches are applied to a control circuit disposed in the player housing, which operates the motors and the pickup means according to the timing described later in response to these applied signals.

Figure 26:
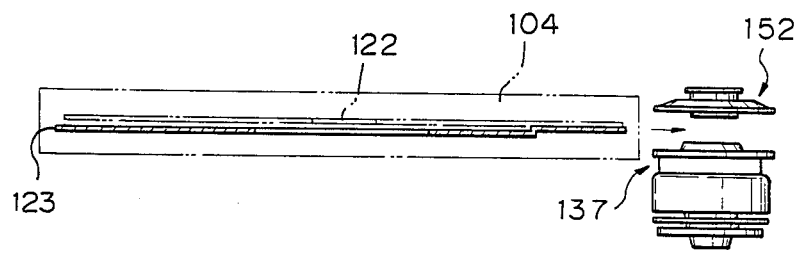
FIGS. 26 and 27 are views explaining operation of the front loading disc player illustrated in FIGS. 18 through 25.

A playback process of the front loading disc player of the above structure will be described also with reference to FIGS. 26 and 27. The carrier 104 is caused to project from the player housing 102, as shown in FIG. 18. Then, discs 122 to be played back are placed respectively on the trays 123 on the carriers 104, and then the keyboard 105 is operated upon to start playing back the discs.

Figure 27:
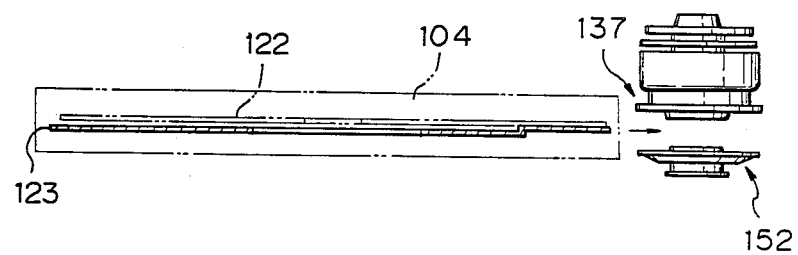

When a disc playback starting command is given, whether the playback means including the turntable 137 is in the normal position or not is confirmed. Then, the motor 111 is rotated in the normal direction to store the carriers 104 back into the player housing 102. As shown in FIG. 26, the tray 123 which carries the disc 122 to be played back first is moved rearwardly (in the direction of the arrow Y) with respect to the carrier 104 to position the disc 122 in the playback position directly above the turntable 137. The vertically movable base 168 carrying the playback means is elevated a predetermined distance to place the disc 122 from the tray 123 onto the turntable 137. The motor 155 is rotated in the normal direction to clamp the disc 122, and then the motor 147 is rotated to start moving the carriage 143 carrying the optical pickup means for playing back the lower side of the disc 122. After the lower side of the disc 122 has been played back, the disc 122 is unclamped, and the base 168 is lowered to return the disc 122 from the turntable 137 to the tray 123. The tray 123 carrying the disc 122 again is returned to the position directly above the carrier 104 by reversing the motor 132. Then, the upper side of the disc 122 starts being played back in the following manner:

The motor 64 is rotated in the normal direction to rotate the playback means including the turntable 137 into the inverted position as shown in FIG. 27. Thereafter, the motor 132 is rotated in the normal direction to move the disc 122 on the tray 123 directly below the turntable 137. Then, the motor 15 is rotated in the normal direction to clamp the disc 122. After completion of the clamping of the disc 122, the upper side of the disc 122 is played back.

After the upper side of the disc 122 has been played back, the motor 155 is reversed to unclamp the disc 122. In response to the disc unclamping operation, the disc 122 which has been pressed against the turntable 137 is transferred onto the tray 123. Thereafter, the motor 132 is reversed to return the tray 123 directly above the carrier 104.

Then, the discs placed on the trays 123 on the remaining two carriers 104 are played back in the same manner. Both sides of each of the three discs are played back in the manner described above.

As described above, the front loading disc player according to the present invention has the playback means moving mechanism for moving the playback means including the turntable and the pickup means between the first position corresponding to one side of a disc having reached the playback position and the second position corresponding to the other side of the disc.

Therefore, after one side of the disc has been played back, the other side of the disc can be played back without ejecting and reloading the disc.

Only one expensive pickup means is required, and the playback means moving mechanism which is required only to carry the pickup means and the turntable and move them between the positions corresponding to both sides of the disc is relatively simple in construction and inexpensive. Therefore, the disc player is of a reduced cost.

The playback means moving mechanism has the support member supporting the playback means including the turntable and the pickup means, the pivotal support mechanism for pivotally supporting the support member to allow the playback means to rotate between the first position corresponding to one side of the disc having reached the playback position and the second position corresponding to the other side of the disc, and the driving means for rotating the support member.

The cost of the disc player is low because of a relatively simple and inexpensive structure by which the support member supporting the pickup means and the turntable is rotated between the positions corresponding to both sides of the disc.

Moreover, the pivot axis of the support member is parallel to the direction in which the pickup means moves or substantially normal to the direction in which the disc is transferred.

With this arrangement, the space in the player housing is effectively utilized, and any dead space therein is reduced to a minimum, thus making the overall disc player small in size.

The distance between the disc carrier surface of the turntable when the playback means is in the first position and the disc carrier surface of the turntable when the playback means is in the second position is equal to the thickness of the disc, and the median plane of the thickness of the disc placed on the turntable and the center of rotation of the turntable intersect at a point where the pivot axis of the support member passes.

This arrangement permits discs on the turntable to be in the same position when the playback means is in the first and second positions. Therefore, only one sensor is required to detect when a disc having been transferred by the disc transfer mechanism is mounted on the turntable. As a result, the process for programming the control circuit for controlling the disc player is simplified, resulting in a further reduction in the cost.

In the front loading disc player of the present invention, the tray for carrying a disc, which is disposed on the carrier movable in the first direction with respect to the player housing, is movable in the first direction with respect to the carrier and in the second direction normal to (for example) the first direction.

Accordingly, the tray may be moved into the projected and stored positions with respect to the player housing and also into the playback position way back in the player housing. Consequently, it is not necessary to provide two pickup means positioned in sandwiching relation to a disc carried on the tray having reached the playback position, but only one pickup means movable to face selectively both sides of the disc is employed to play back both disc sides without ejecting and reloading the disc.

Only one carrier is employed, and a plurality of trays are provided on the carrier.

A plurality of discs can successively be played back by selectively moving the trays between the stored and playback positions with respect to the carrier. Since only one carrier is used whereas plural trays are provided, the number of parts required is smaller than would be if a carrier and its driving mechanism were associated with each of the trays, the player structure is simplified, and the disc player is small in size and low in cost.

A disc can be moved between the projected, stored, and playback positions by relatively moving the carrier and the tray. Accordingly, the strokes of movement of the carrier and the tray can be reduced, and any increase in the size of the overall disc player can be minimized.

In the front loading disc player according to the present invention, the tray for carrying a disc, which is disposed on the carrier movable in the first direction with respect to the player housing, is movable in the first direction with respect to the carrier and also in the second direction normal to (for example) the first direction, and the playback means moving mechanism is provided for moving the playback means including the turntable, the pickup means, and the disc clamping mechanism between the first position corresponding to one side of a disc having reached the playback position and the second position corresponding to the other side of the disc. When the playback means is in the second position, the tray is moved toward the turntable and thereafter the disc clamping mechanism is actuated to clamp the disc under the control of the control means which controls operation of the playback means, the carrier, and the tray.

When the playback means is in the second position in order to play back the upper side of a disc in the playback position, the disc on the tray is lifted and held against the turntable over the disc by the disc clamping mechanism positioned directly below the disc. Immediately before this, the tray carrying the disc is moved closely to the turntable, as described above. As a consequence, the distance which the disc is lifted by the disc clamping mechanism is reduced that much, and even when shocks are applied to the disc player, the disc is prevented from being dislodged while it is being lifted. Thus, the disc can reliably and highly accurately be loaded or ejected.

In the front loading disc player according to the present invention, furthermore, the carrier is movable in the first direction with respect to the player housing, and plural trays for carrying discs are disposed on the carrier in superposed relation in the second direction normal to (for example) the first direction. The trays are thus movable in the first and second directions with respect to the carrier. The distance between disc carrier surfaces of adjacent ones of the trays is equal to a unit distance which each of the trays is movable in the second direction.

With this arrangement, the discs successively transferred onto the turntable by the disc transfer mechanism can be positioned in the same position in the second direction. By positioning a plurality of successively transferred discs in the same position, the process of programming the control circuit for controlling the disc player is simplified, and the cost of the disc player is lowered.

Moreover, the front loading disc player of the present invention has a plurality of carriers arranged side by side in the first direction and movable in the second direction with respect to the player housing, and a plurality of trays disposed on the carriers, respectively, for carrying respective discs and movable in the second direction. The front loading disc player also includes the first playback means moving mechanism for moving the playback means including the turntable and the pickup means between the first position corresponding to one side of a disc having reached the playback position and the second position corresponding to the other side of the disc, and the second playback means moving mechanism for carrying and moving the playback means and the first playback means moving mechanism in the first direction.

Therefore, by selectively moving the trays with respect to the carriers to transfer a disc from the tray into the playback position, and also by operating the first and second playback means moving mechanisms to move the playback means to face both sides of the disc in the playback position, both sides of each of plural discs can be played back without ejecting and reloading them.

Only one expensive pickup means is employed, and the first and second playback means moving mechanisms for carrying the pickup means and the turntable and moving them to face both sides of a disc are relatively simple and inexpensive. Therefore, the cost of the disc player is low.

Although certain preferred embodiments have been shown and described, it should be understood that many changes and modifications may be made therein without departing from the scope of the appended claims.

What is claimed is:

1. A front loading optical disc player comprising a player housing having at least one opening to which an optical disc to be played is applied, said optical disc having information recorded on both of first and second sides thereof, playback means disposed within said player housing, a transfer path extending from said opening to a playback position proximate said playback means, a disc transfer mechanism for transferring said optical disc applied to said opening along said transfer path to said playback position, and a reference plane defined generally by the plane of said optical disc when being transferred along said transfer path, said playback means comprising:

a rotatable support member disposed within said housing and having a rotating axis about which it is able to rotate;

a disc clamping and rotating means mounted on said rotatable support member, said disc clamping and rotating means having a turntable with a disc carrier surface, and means for clamping said optical disc at said playback position onto said disc carrier surface and rotating said turntable while said disc carrier surface is maintained substantially parallel to said reference plane;

a pickup carriage assembly mounted on said rotatable support member, said pickup carriage assembly including an optical pickup operable to read information recorded on said optical disc, said pickup carriage assembly being movable for positioning said optical pickup relative to said optical disc when clamped at said playback position, to read information from said disc as the disc is rotated on said turntable;

said rotatable support member being rotatable through 180° about said rotating axis to assume said first and said second positions with respect to said reference plane, said first position placing said turntable of said disc clamping and rotating means and said pickup carriage assembly in a first orientation relative to said optical disc to read information recorded on said first side of said disc, and said second position placing said turntable of said disc clamping and rotating means and said pickup carriage assembly in a second and opposite orientation relative to said optical disc to read information recorded on said second side of said disc, said first and said second sides of said disc being read with said turntable being rotated in the same direction.

2. A front loading optical disc player according to claim 1, in which said disc transfer mechanism has a plurality of carriers each movable in a first direction relative to said opening of the player housing, at least one tray disposed on each of said carriers and being movable in said first direction and a second direction substantially perpendicular to said first direction, tray driving means for moving said tray with respect to said carrier, and further comprising a support member positioning means connected to said rotatable support member for positioning said rotatable support member along said second direction to a selected position with respect to the respective carrier.

3. A front loading optical disc player according to claim 1, wherein said rotating axis of said rotatable support member is parallel to the direction in which said pickup is moved by said pickup carriage assembly.

4. A front loading optical disc player according to claim 1, wherein said rotating axis is substantially normal to the direction in which the disc is transferred.

5. A front loading optical disc player according to claim 1, wherein the distance between said disc carrier surface of said turntable when said rotatable support member is in the first position and the disc carrier surface of said turntable when said rotatable support member is in the second position is equal to the thickness of the disc.

6. A front loading optical disc player according to claim 1, wherein said disc transfer mechanism has a carrier movable in a first direction with respect to said player housing, at least one tray for carrying a disc, said tray being disposed on said carrier on said carrier and having a disc support surface, and being movable in said first direction and a second direction substantially perpendicular to said first direction, and tray driving means for moving said tray with respect to said carrier.

7. A front loading optical disc player according to claim 6, further including control means for controlling said disc clamping and rotating means and said disc transfer mechanism, said control means for moving said tray proximate said turntable and thereafter actuating said disc clamping means to clamp the disc onto said turntable.

8. A front loading optical disc player according to claim 6, wherein a plurality of trays is disposed on said carrier in superposed relation along said second direction, and said tray driving means being adapted to move said trays while maintaining a predetermined distance between said disc support surfaces of adjacent ones of said trays.

* * * * *